(12) United States Patent
Kim et al.

(10) Patent No.: US 10,015,715 B2
(45) Date of Patent: Jul. 3, 2018

(54) METHOD OF RECEIVING MBMS SERVICE IN WIRELESS COMMUNICATION SYSTEM AND APPARATUS THEREOF

(71) Applicant: LG ELECTRONICS INC., Seoul (KR)

(72) Inventors: Sangwon Kim, Seoul (KR); Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 99 days.

(21) Appl. No.: 15/025,516

(22) PCT Filed: Oct. 30, 2014

(86) PCT No.: PCT/KR2014/010276
§ 371 (c)(1),
(2) Date: Mar. 28, 2016

(87) PCT Pub. No.: WO2015/065053
PCT Pub. Date: May 7, 2015

(65) Prior Publication Data
US 2016/0249266 A1    Aug. 25, 2016

Related U.S. Application Data

(60) Provisional application No. 61/897,835, filed on Oct. 31, 2013.

(51) Int. Cl.
*H04H 1/00* (2006.01)
*H04W 36/26* (2009.01)
(Continued)

(52) U.S. Cl.
CPC .............. *H04W 36/26* (2013.01); *H04W 4/06* (2013.01); *H04W 24/08* (2013.01); *H04W 36/00* (2013.01); *H04W 68/005* (2013.01); *H04W 68/00* (2013.01)

(58) Field of Classification Search
CPC ... H04W 36/26; H04W 24/08; H04W 68/005; H04W 36/00; H04W 4/06; H04W 68/00
(Continued)

(56) References Cited

U.S. PATENT DOCUMENTS 9,155,069 B2 * 10/2015 Kim ....................... H04W 36/06
9,237,498 B2 *  1/2016 Xu  .......................... H04W 4/06
(Continued)

FOREIGN PATENT DOCUMENTS

WO    2013025033    2/2013
WO    2013051832    4/2013
(Continued)

OTHER PUBLICATIONS

PCT International Application No. PCT/KR2014/010276, Written Opinion of the International Searching Authority dated Feb. 17, 2015, 2 pages.

*Primary Examiner* — Chuong T Ho
(74) *Attorney, Agent, or Firm* — Lee Hong Degerman Kang Waimey

(57) ABSTRACT

Disclosed are a method of receiving a MBMS service in a wireless communication system and an apparatus thereof. The method of receiving a Multimedia Broadcast/Multicast Service (MBMS) service in a wireless communication for supporting an MBMS, includes: receiving, by a User Equipment (UE), state information of an interested MBMS service provided by a preconfigured MBMS Point to Multipoint Radio Bearer (MRB) from a network; and determining, by the UE, whether to make a cell reselection priority of a
(Continued)

MBMS frequency providing the interested MBMS service to be a highest priority according to the state information of the MBMS service.

7 Claims, 13 Drawing Sheets

(51) Int. Cl.
    *H04W 4/06* (2009.01)
    *H04W 36/00* (2009.01)
    *H04W 24/08* (2009.01)
    *H04W 68/00* (2009.01)

(58) Field of Classification Search
    USPC .......................................................... 370/312
    See application file for complete search history.

(56) References Cited

U.S. PATENT DOCUMENTS

| | | | |
|---|---|---|---|
| 9,445,328 B2 * | 9/2016 | Lee | H04W 36/08 |
| 9,467,973 B2 * | 10/2016 | Kim | H04W 36/06 |
| 9,521,008 B2 * | 12/2016 | Kim | H04L 12/1881 |
| 2005/0090278 A1 | 4/2005 | Jeong et al. | |
| 2005/0174956 A1 * | 8/2005 | Yi | H04W 76/068 |
| | | | 370/312 |
| 2010/0157873 A1 | 6/2010 | Yi et al. | |
| 2013/0229974 A1 * | 9/2013 | Xu | H04W 4/06 |
| | | | 370/312 |
| 2014/0044035 A1 * | 2/2014 | Hwang | H04W 4/06 |
| | | | 370/312 |
| 2014/0211685 A1 * | 7/2014 | Kim | H04W 36/06 |
| | | | 370/312 |
| 2014/0233452 A1 * | 8/2014 | Kim | H04L 12/1881 |
| | | | 370/312 |
| 2016/0014721 A1 * | 1/2016 | Kim | H04W 36/06 |
| | | | 370/312 |
| 2017/0070360 A1 * | 3/2017 | Kim | H04W 36/06 |

FOREIGN PATENT DOCUMENTS

| | | | |
|---|---|---|---|
| WO | WO2013055099 | * | 4/2013 |
| WO | 2013151360 | | 10/2013 |

* cited by examiner

[Fig. 1]
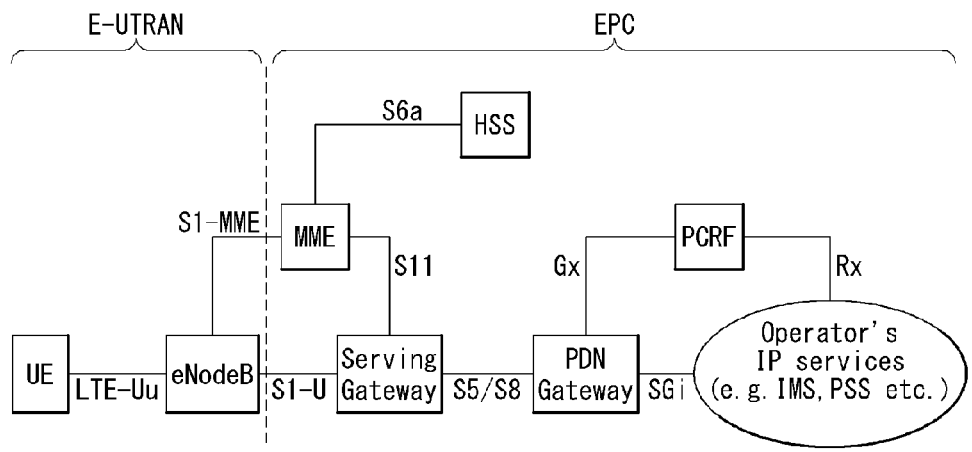
[Fig. 2]
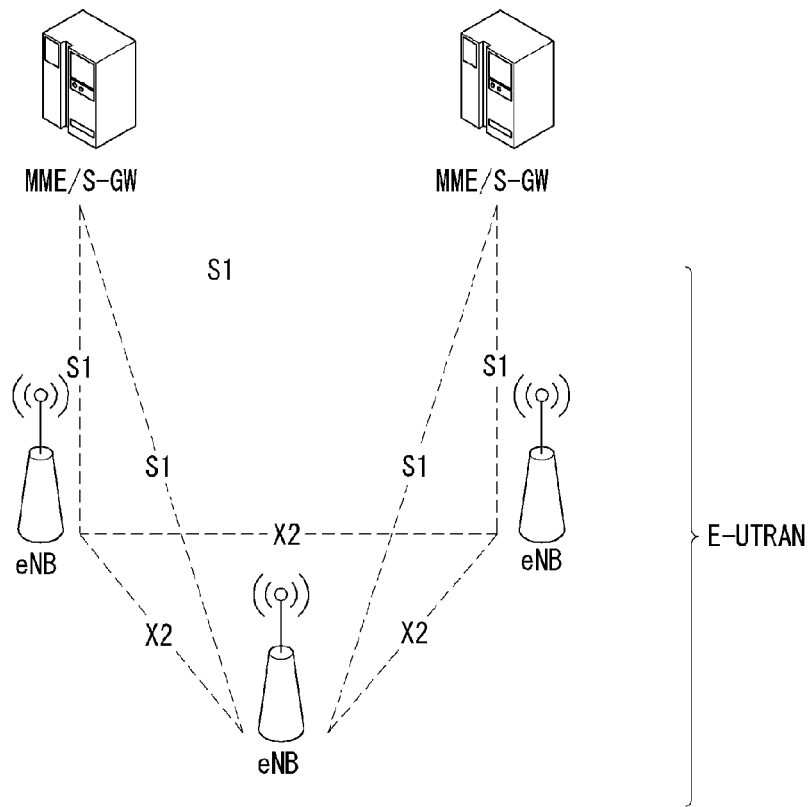

[Fig. 3]
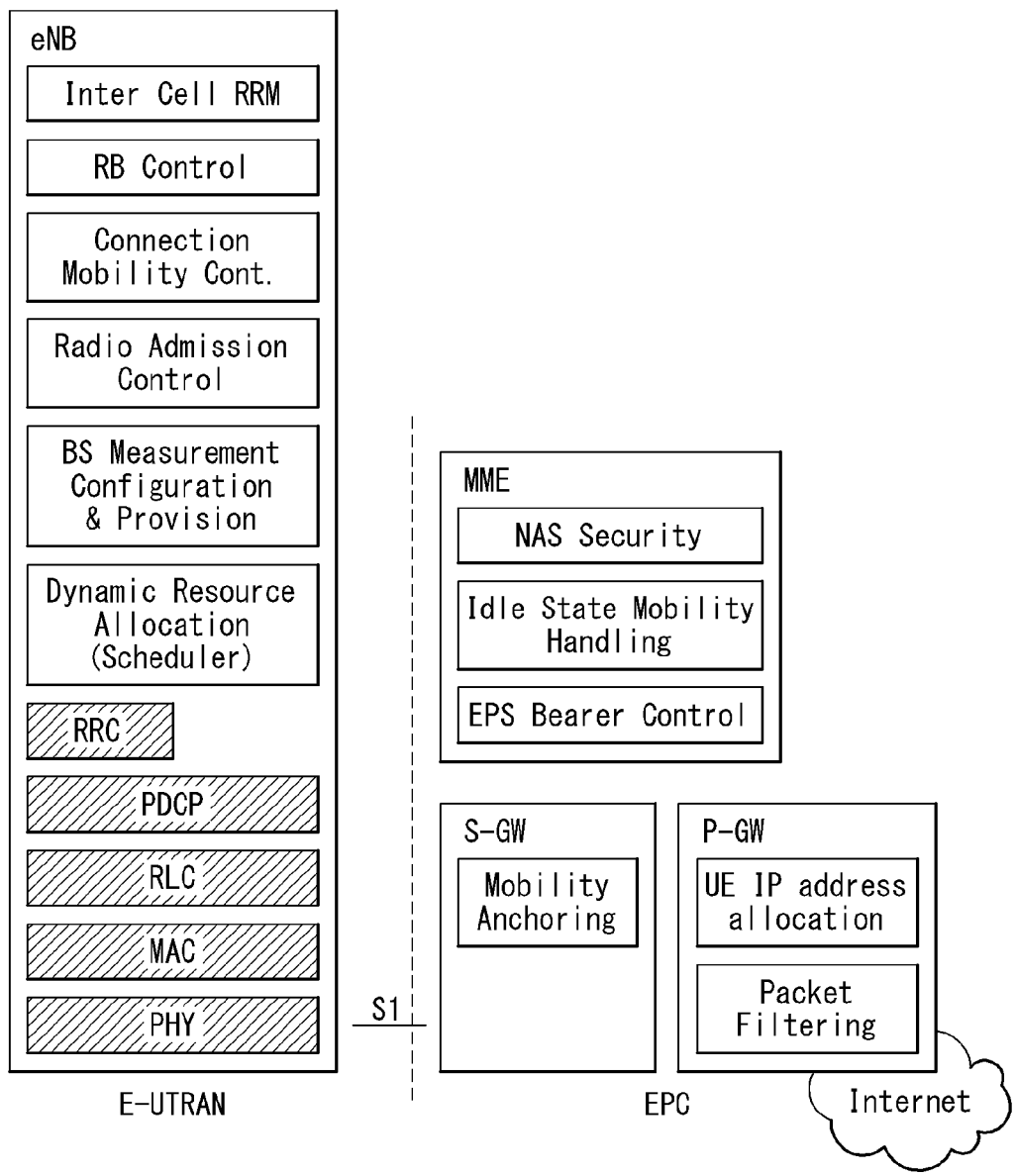

[Fig. 4]
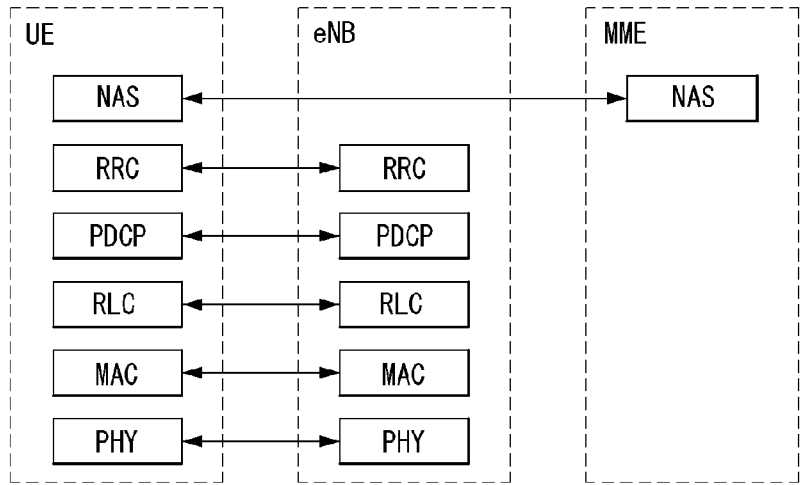
(a) Control-plane protocal stack
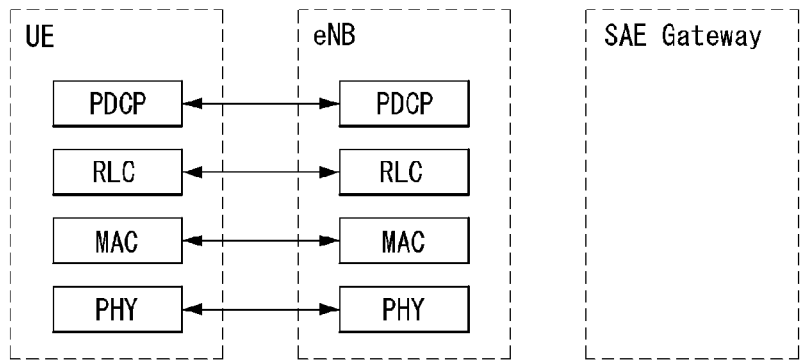
(b) Use-plane protocol stack
[Fig. 5]
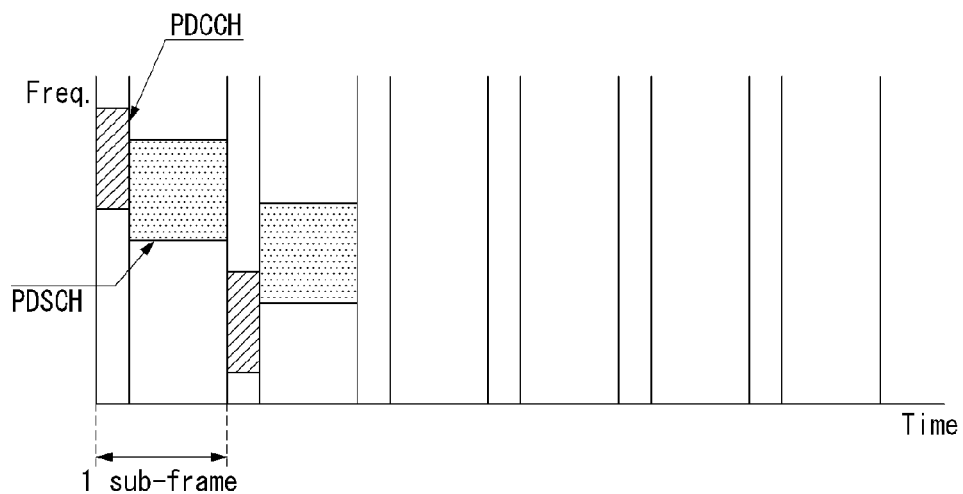

[Fig. 6]
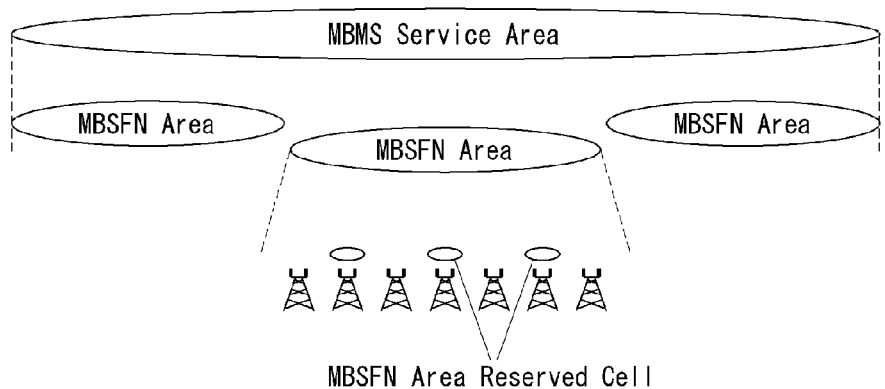
[Fig. 7]
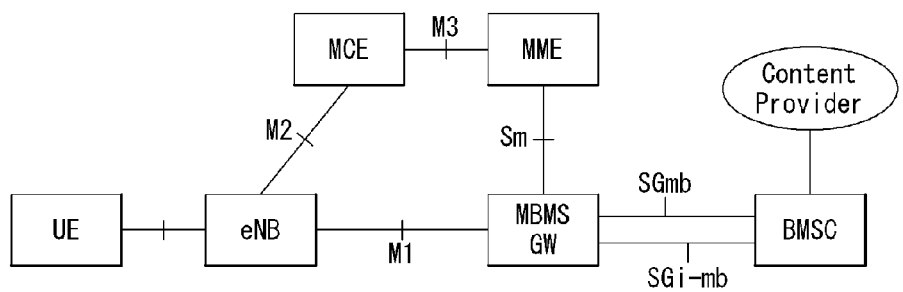
[Fig. 8]
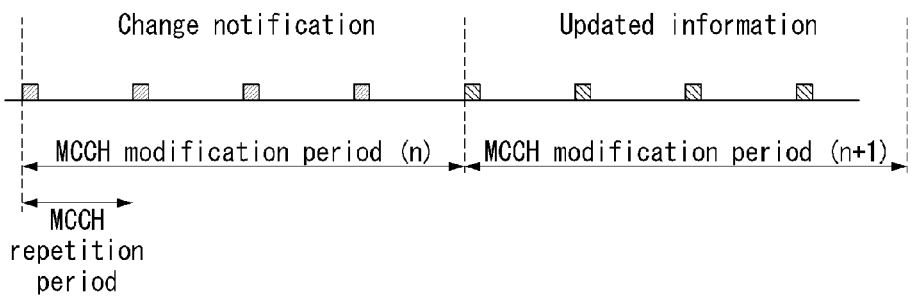

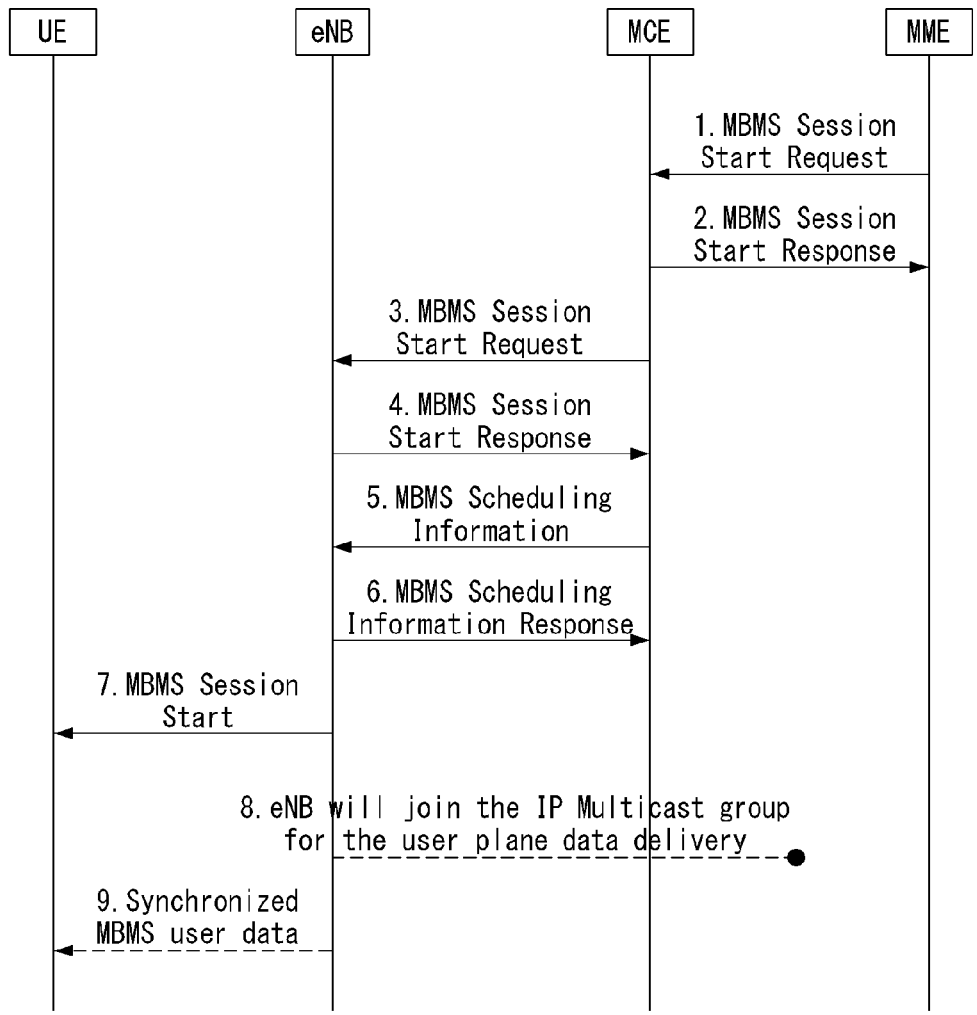

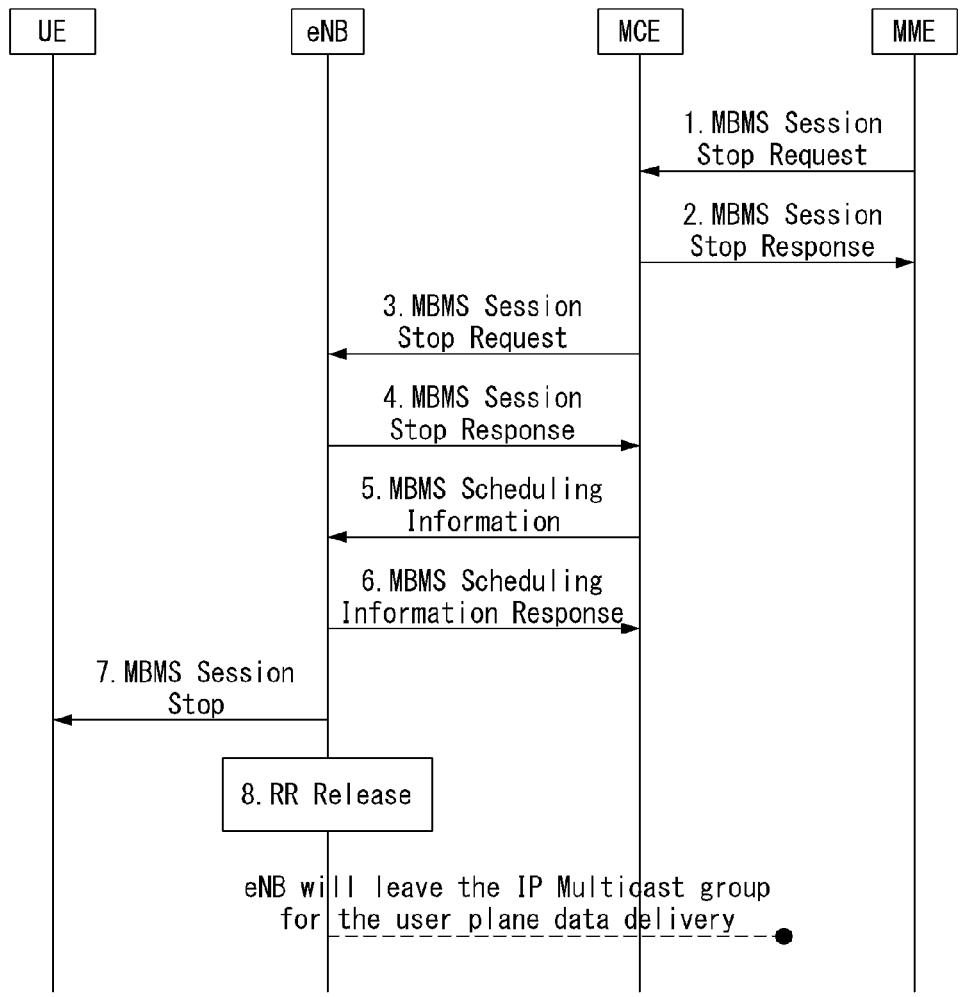
[Fig. 10]
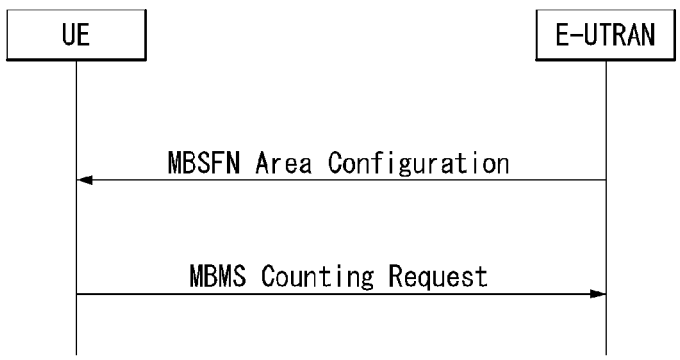
[Fig. 11]

[Fig. 12]
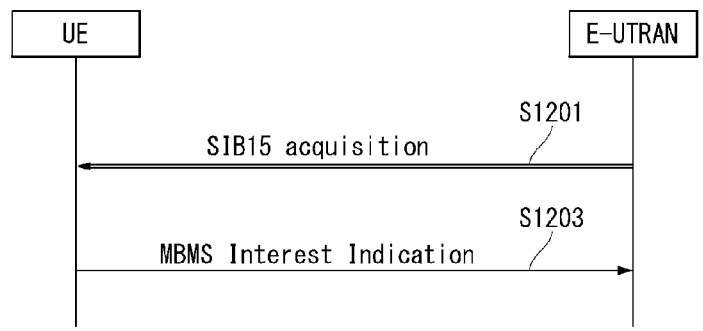
[Fig. 13]
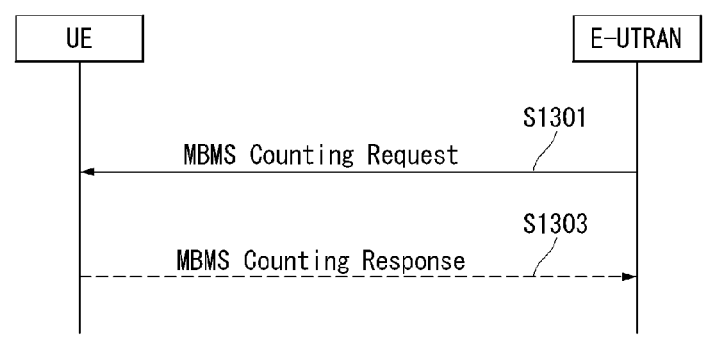
[Fig. 14]
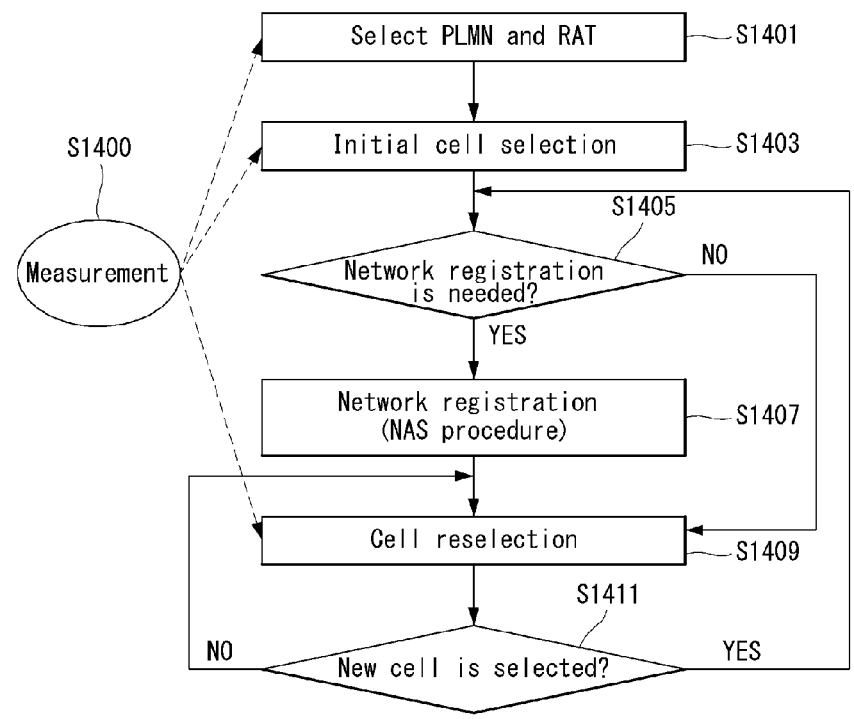

[Fig. 15]
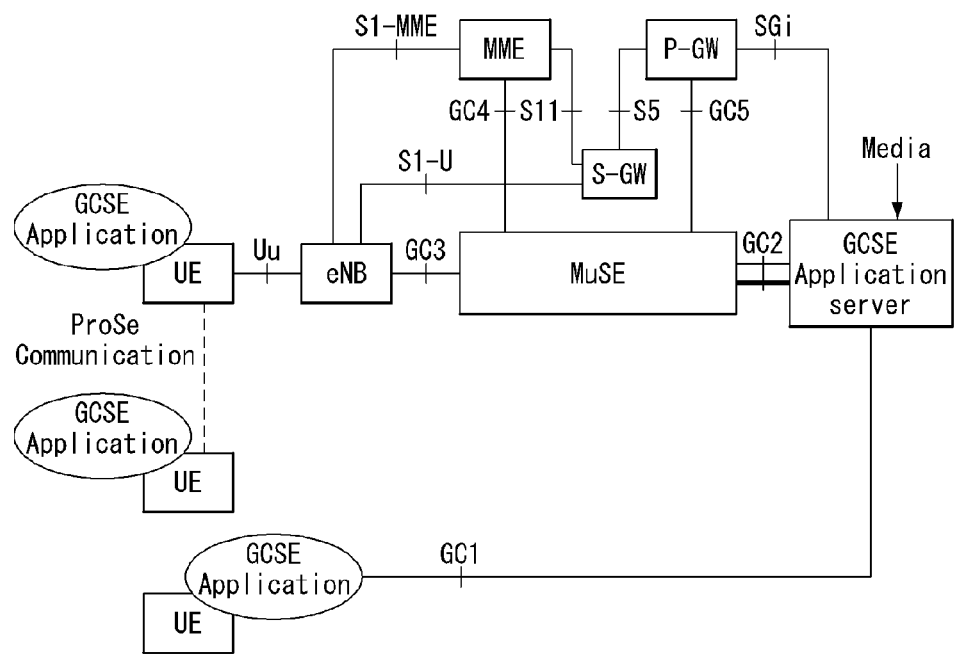

[Fig. 16a]
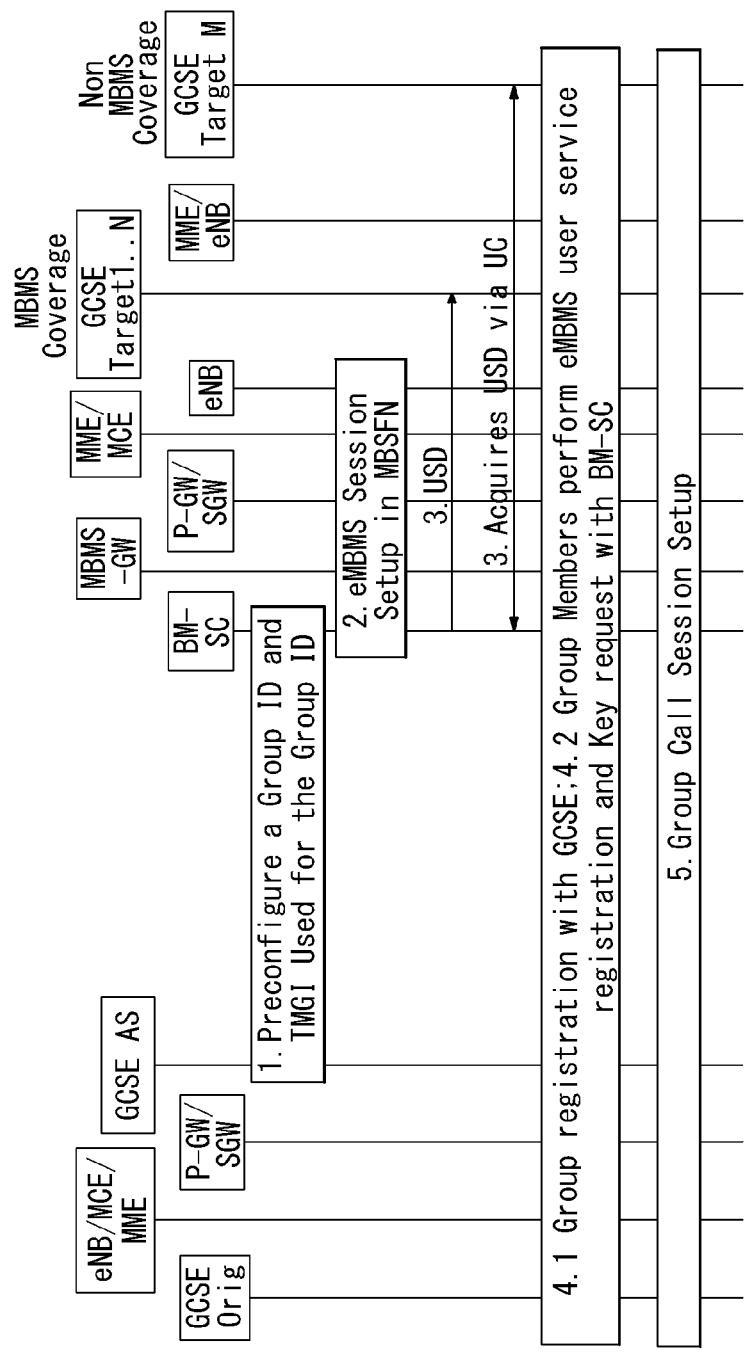

[Fig. 16b]
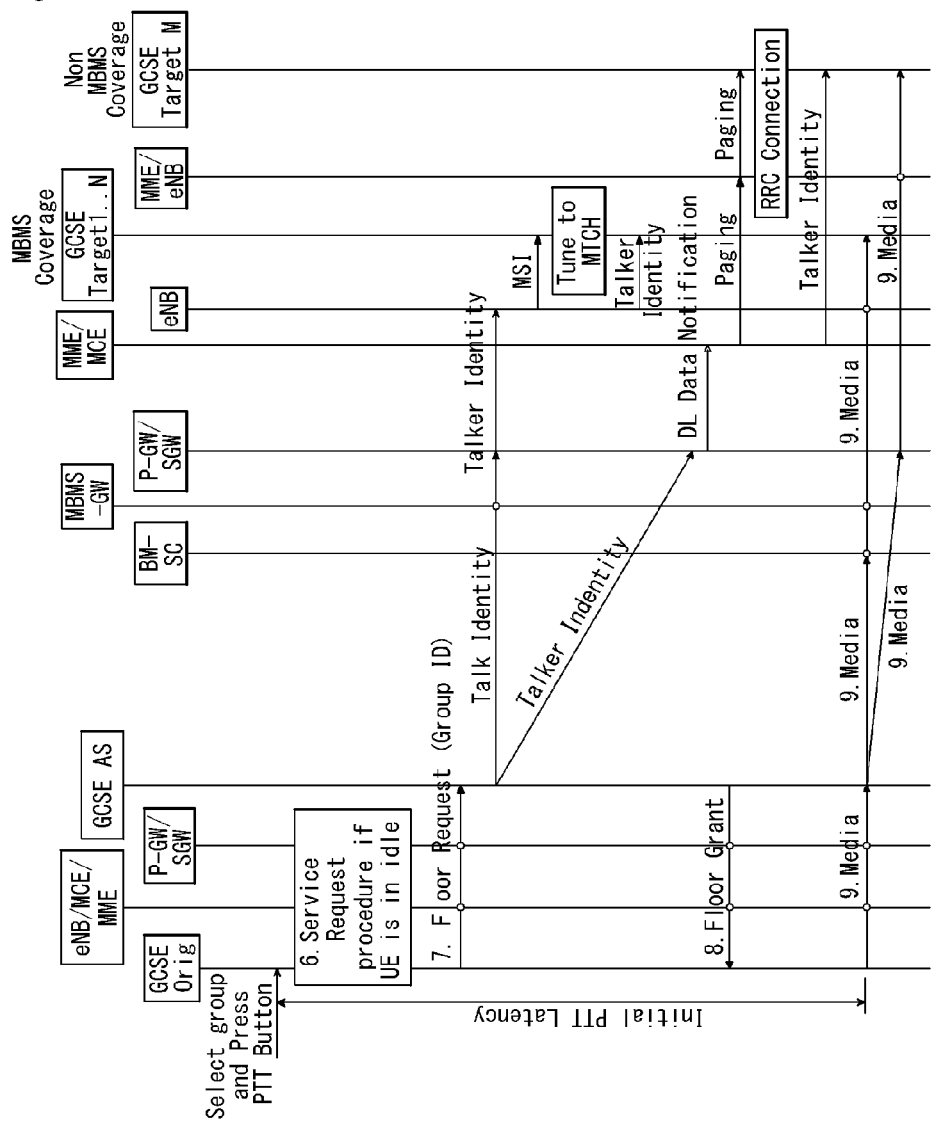
[Fig. 17]
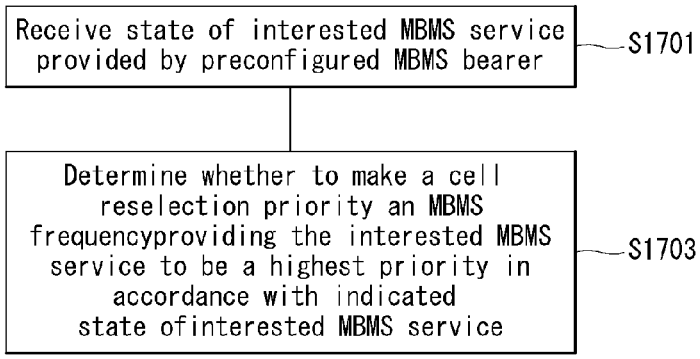

[Fig. 18]
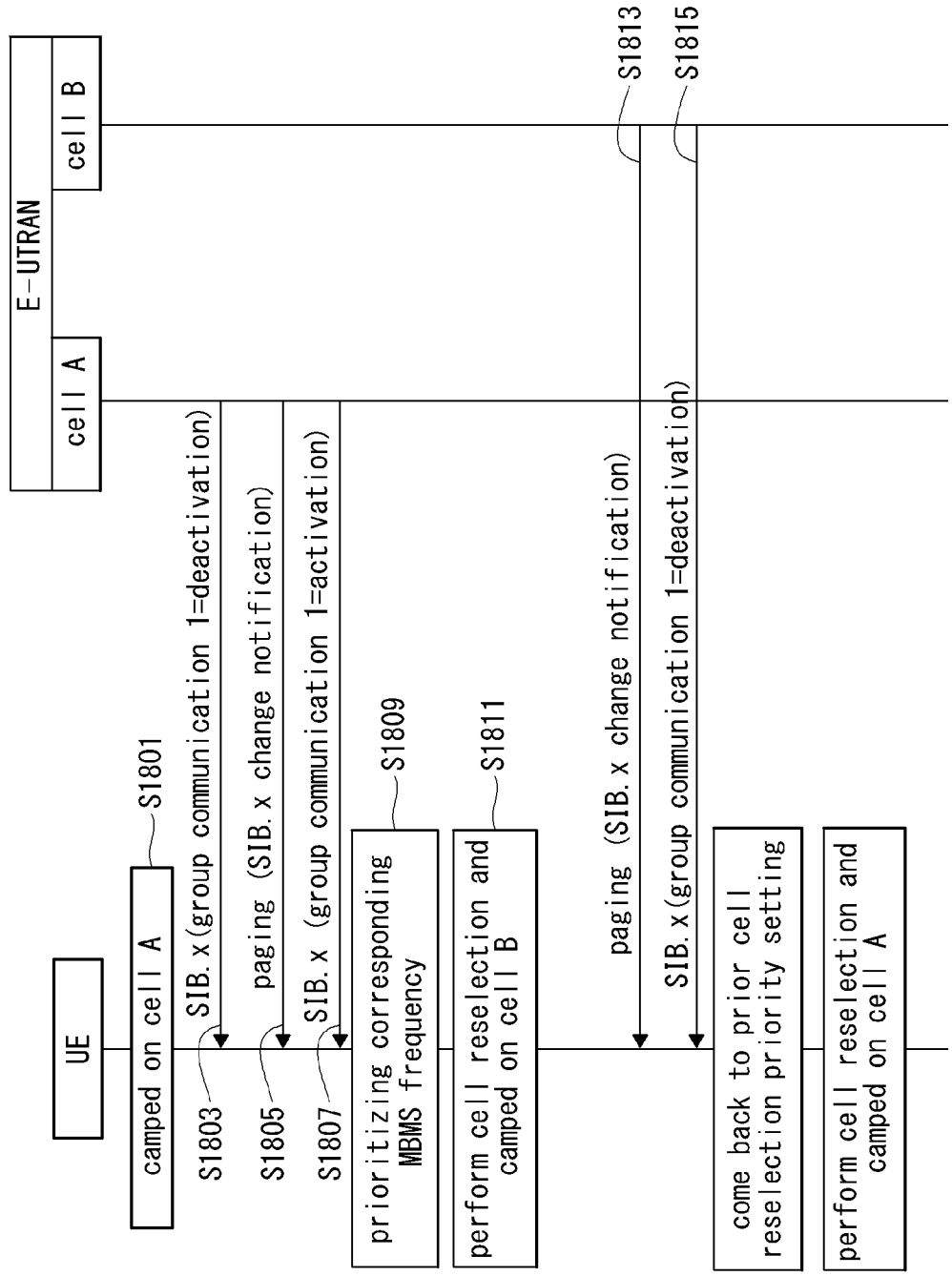

[Fig. 19]
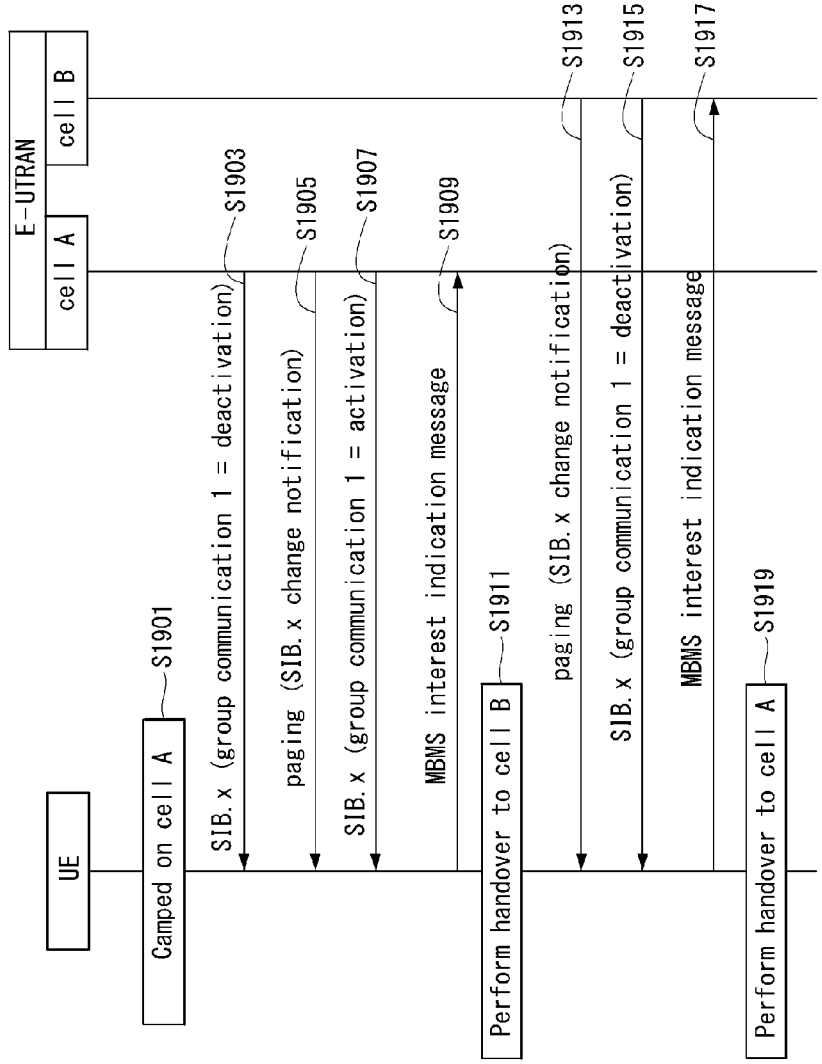

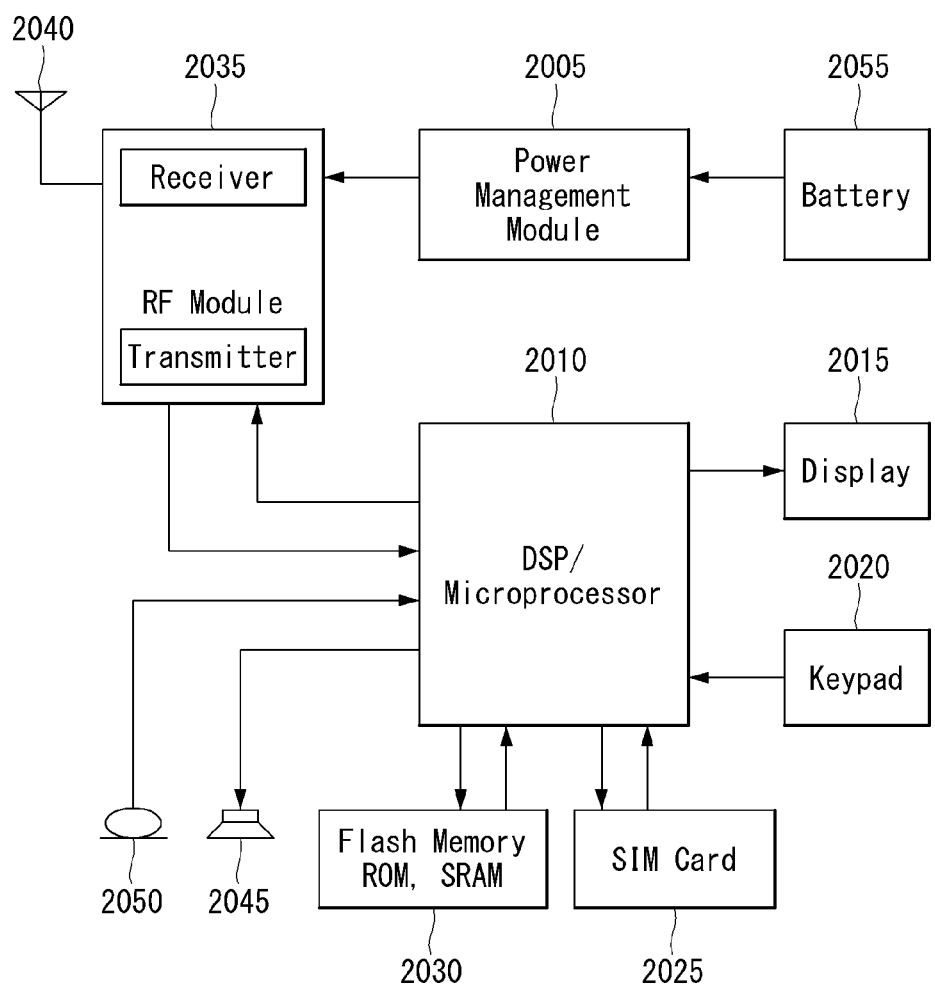
[Fig. 20]

METHOD OF RECEIVING MBMS SERVICE IN WIRELESS COMMUNICATION SYSTEM AND APPARATUS THEREOF

CROSS-REFERENCE TO RELATED APPLICATIONS

This application is the National Stage filing under 35 U.S.C. 371 of International Application No. PCT/KR2014/010276, filed on Oct. 30, 2014, which claims the benefit of U.S. Provisional Application No. 61/897,835 filed on Oct. 31, 2013, the contents of which are all hereby incorporated by reference herein in their entirety.

TECHNICAL FIELD

The present invention relates to a wireless communication system, more particularly to a method of a Multimedia Broadcast/Multicast Service (MBMS) service through a preconfigured MBMS bearer in a wireless communication system for supporting a MBMS and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

SUMMARY OF INVENTION

Technical Problem

An object of the present invention is to provide a method of receiving a MBMS service through a preconfigured MBMS bearer in a wireless communication system for supporting a MBMS.

The present invention further provides a method of controlling congestion generated from a preconfigured MBMS bearer.

The technical problems solved by the present invention are not limited to the above technical problems and those skilled in the art may understand other technical problems from the following description.

Solution to Problem

According to an aspect of the present invention, there is provided a method of receiving a Multimedia Broadcast/Multicast Service (MBMS) service in a wireless communication for supporting an MBMS, the method including: receiving, by a User Equipment (UE), state information of an interested MBMS service provided by a preconfigured MBMS Point to Multipoint Radio Bearer (MRB) from a network; and determining, by the UE, whether to make a cell reselection priority of a MBMS frequency providing the interested MBMS service to be a highest priority according to the state information of the MBMS service.

According to another aspect of the present invention, there is provided a User Equipment (UE) for receiving a Multimedia Broadcast/Multicast Service (MBMS) service in a wireless communication for supporting an MBMS, the UE including: a Radio Frequency (RF) which transmits/receives a wireless signal; and a processor, wherein the processor receives state information of an interested MBMS service provided by a preconfigured MRB from a network, and determines whether to make a cell reselection priority of a MBMS frequency providing the interested MBMS service to be a highest priority according to the state information of the MBMS service.

The state information of the MBMS service may indicate an activation state to which data of the MBMS service are transmitted or indicates a deactivation state to which the data of the MBMS service are not transmitted.

The UE may make the cell reselection priority of the MBMS frequency providing the interested MBMS service to be the highest priority when the state information of the MBMS service indicates the activation state.

The UE may not change the cell reselection priority of the MBMS frequency providing the interested MBMS service when the state information of the MBMS service indicates the deactivation state.

The method may further include performing, by the UE, a cell reselection procedure.

The state information of the MBMS service is transmitted through one of system information, a Medium Access Control (MAC) Control Element (CE), or a paging message.

The method may further include receiving, by the UE, a change notification indicating that the state information of the MBMS service is changed from the network.

The method change notification may be transmitted through a paging message.

A paging occasion and a paging cycle with respect to the paging message and a Paging Radio Network Temporary Identifier (P-RNTI) for identifying the paging message may be dedicatedly defined in the MBMS service.

Advantageous Effects of Invention

An embodiment of the present invention may prevent congestion generated from a preconfigured MBMS bearer by monitoring a corresponding MBMS frequency only when MBMS data are transmitted through the preconfigured MBMS bearer in the wireless communication system for supporting a MBMS.

Further, power consumption of UE may be reduced by monitoring a corresponding MBMS frequency only when the MBMS service data are transmitted through the preconfigured MBMS bearer.

The effects of the present invention are not limited to the above-described effects and other effects which are not described herein will become apparent to those skilled in the art from the following description.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram schematically illustrating an Evolved Packet System (EPS) according to the present invention.

FIG. 2 illustrates a schematic structure a network structure of an evolved universal mobile telecommunication system (E-UMTS) to which the present invention can be applied.

FIG. 3 illustrates architecture of a typical E-UTRAN and a typical EPC to which the present invention can be applied.

FIG. 4 illustrates the configurations of a control plane and a user plane of a radio interface protocol between the E-UTRAN and a UE in the wireless communication system to which the present invention can be applied.

FIG. 5 illustrates a downlink subframe and physical channels in the wireless communication system to which the present invention can be applied.

FIG. 6 illustrates definitions of MBMS in the wireless communication system to which the present invention can be applied.

FIG. 7 illustrates logical architecture of MBMS in the wireless communication system to which the present invention can be applied.

FIG. 8 illustrates Change of MCCH Information in the wireless communication system to which the present invention can be applied.

FIG. 9 illustrates MBMS session start procedure in the wireless communication system to which the present invention can be applied.

FIG. 10 illustrates MBMS session stop procedure in the wireless communication system to which the present invention can be applied.

FIG. 11 illustrates an MCCH information acquisition procedure in the wireless communication system to which the present invention can be applied.

FIG. 12 illustrates an MBMS interest indication procedure in the wireless communication system to which the present invention can be applied.

FIG. 13 illustrates an MBMS Counting procedure in the wireless communication system to which the present invention can be applied.

FIG. 14 illustrates a procedure for selecting a cell by a UE in idle mode in the wireless communication system to which the present invention can be applied.

FIG. 15 illustrates GCSE architecture in the wireless communication system to which the present invention can be applied.

FIGS. 16a and 16b illustrate Group Communication procedure over preconfigured eMBMS in the wireless communication system to which the present invention can be applied.

FIG. 17 is a diagram illustrating a preconfigured MRB control method according to an embodiment of the present invention.

FIG. 18 is a diagram illustrating a preconfigured MRB control method according to an embodiment of the present invention.

FIG. 19 is a diagram illustrating a preconfigured MRB control method according to an embodiment of the present invention.

FIG. 20 illustrates a block diagram of a wireless communication apparatus according to an embodiment of the present invention.

MODE FOR THE INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. That is, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16

(WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink LTE-A is an evolution of 3GPP LTE.

For clarity, this application focuses on the 3GPP LTE/LTE-A system. However, the technical features of the present invention are not limited thereto.

General System to which the Present Invention can be Applied

FIG. 1 is a diagram schematically illustrating an Evolved Packet System (EPS) according to the present invention.

A configuration diagram of FIG. 1 is obtained by schematically reconfiguring a structure of an Evolved Packet System (EPS) including an Evolved Packet Core (EPC).

The EPC is a core element of a System Architecture Evolution (SAE) for improving performances of 3GPP techniques. The SAE represents a research subject to determine a network structure to support mobility between various types of networks. For example, the SAE is aimed at providing a packet-based system for supporting various wireless access techniques based on an IP and providing more improved data transmission capability.

In detail, the EPC is a core network of an IP mobile communication system for a 3GPP LTE system. In an existing mobile communication system (that is, second or third generation mobile communication system), a function of a core network is implemented through two distinguished sub-domains including Circuit-Switched (CS) for a sound and Packet-Switched (PS) for data. However, in the 3GPP LTE system being an evolved version of the third generation mobile communication system, sub-domains of a CS and a PS is unified as one IP domain. That is, in the 3GPP LTE system, connection between UEs having IP capability may be configured by a base station (for example, evolved Node B (eNodeB)), EPC, and application domain (for example, IMS). That is, the EPC is an essential configuration to implement an end-to-end IP service.

The EPC may include various constituent elements. FIG. 1 illustrates some of the various constituent elements, that is, a Serving Gateway (SGW), a Packet Data Network Gateway (PDN GW), a Mobility Management Entity (MME), a Home Subscriber Ser (HSS), and a Policy Control and Charging Rules Function (PCRF).

The SGW is operated as a boundary point between a radio access network (RAN) and a core network, and is an element to perform a function for maintaining a data path between the eNodeB and a PDN GW. Further, when the UE moves through a serving zone by an eNodeB, the SGW serves as a local mobility anchor point. That is, packets may be routed through the SGW for mobility in an E-UTRAN (Universal Mobile Telecommunications System (Evolved-UMTS) Terrestrial Radio Access Network defined after 3GPP release-8). In addition, the SGW may function as an anchor point for mobility with another 3GPP network (RAN defined before a 3GPP release-8, for example, UTRAN or GERAN (GSM (Global System for Mobile Communication)/EDGE (Enhanced Data rates for Global Evolution) Radio Access Network).

The PDN GW represents a termination point of a data interface toward a packet data network. The PDN GW may support policy enforcement features, packet filtering, charging support, and the like. Further, the PDN GW may serve as an anchor for mobility management with a 3GPP network and a non-3GPP network (for example, a non-reliable network such as an Interworking Wireless Local Area Network (I-WLAN), and a reliable network such as a Code Division Multiple Access (CDMA) network or a Wimax).

Although FIG. 1 illustrates an example of a network structure where the SGW and the PDN GW are configured as a separate gateway, two gateways may be realized according to single gateway configuration Option.

The MME is an element to perform signaling and control functions for supporting access with respect to network connection of the UE, allocation of a network resource, tracking, paging, roaming, and handover. The MME controls control plane functions associated with a subscriber and session management. The MME manages a great number of eNodeBs, and performs signaling to select a gateway of the related art for handover with respect to other 2G/3G networks. Further, the MME performs functions such as Security Procedures, Terminal-to-network Session Handling, and Idle Terminal Location Management.

A Home Subscriber Server (HSS) manages subscriber subscription information (or subscription data or subscription record)).

A Policy Control and Charging Rules Function (PCRF) is a node which a Policy to be applied to the UE, and Policy decision applying Quality of Service (QoS)) as dynamic. A Policy and Charging Control (PCC) rule generated from the PCRF is transferred to the PDN GW.

Referring to FIG. 1, UE having IP capability may access an IP service network (for example, IMS) provided from (that is, an operator) through various elements in an EPC based on 3GPP access and non-3GPP access.

Further, FIG. 1 illustrates various reference points (for example, S1-U, S1-MME, or the like). In the 3GPP system, a conceptual link connecting two functions existing in different functional entities of the E-UTRAN and the EPC is defined as a reference point. Table 1 lists a reference point shown in FIG. 1 and a usable protocol option. There may be various reference points according to a network structure except for examples of table 1.

TABLE 1

| Reference point | Protocol | Description |
|---|---|---|
| S1-MME | S1-AP | Reference point with respect to a control plane protocol between the E-UTRAN and the MME |
| S1-U | GTP-U | Reference point between the E-UTRAN and the SGW with respect to Path switching between eNBs and a user plane tunneling per bearer during handover |
| S6a | Diameter | Reference point with respect to a control plane protocol between the HSS and the MME |
| S5 | GTP, PMIP | Reference point providing user plane tunneling and tunnel management between the SGW and the PDN GW. G5 is used for SGW rearrangement due to UE mobility and when there is a need for connection to PDN GW which is not located together with SGW for required PDN connectivity |
| S11 | GTP-C | Reference point with respect to a control plane protocol between the MME and the SGW |
| Gx | Diameter | Reference point with respect to a control plane protocol between the PCRF and the P-GW |
| SGi | IP | Reference point between the PDN GW and the PDN. In this case, the PDN may correspond to operator external public or private PDN or operator-inside PDN (for example, IMS service) |

FIG. 2 illustrates a schematic structure a network structure of an evolved universal mobile telecommunication system (E-UMTS) to which the present invention can be applied.

An E-UMTS system is an evolved version of the UMTS system. For example, the E-UMTS may be also referred to as an LTE/LTE-A system. The E-UMTS is also referred to as a Long Term Evolution (LTE) system.

The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW (Serving Gateway). The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/Serving Gateways and eNBs.

FIG. 3 illustrates architecture of a typical E-UTRAN and a typical EPC to which the present invention can be applied.

Referring to the FIG. 3, the eNB may perform functions of selection for the gateway (for example, MME), routing toward the gateway during a radio resource control (RRC) activation, scheduling and transmitting of paging messages, scheduling and transmitting of broadcast channel (BCH) information, dynamic allocation of resources to the UEs in both uplink and downlink, configuration and provisioning of eNB measurements, radio bearer control, radio admission control (RAC), and connection mobility control in LTE_ACTIVE state. In the EPC, and as stated above, the gateway may perform functions of paging origination, LTE_IDLE state management, ciphering of the user plane, System Architecture Evolution (SAE) bearer control, and ciphering and integrity protection of NAS signaling.

FIG. 4 illustrates the configurations of a control plane and a user plane of a radio interface protocol between the E-UTRAN and a UE in the wireless communication system to which the present invention can be applied.

FIG. 4(a) shows the respective layers of the radio protocol control plane, and FIG. 4(b) shows the respective layers of the radio protocol user plane.

Referring to the FIG. 4, the protocol layers of a radio interface protocol between the E-UTRAN and a UE can be divided into an L1 layer (first layer), an L2 layer (second layer), and an L3 layer (third layer) based on the lower three layers of the Open System Interconnection (OSI) reference model widely known in communication systems. The radio interface protocol is divided horizontally into a physical layer, a data link layer, and a network layer, and vertically into a user plane for data transmission and a control plane for signaling.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The MAC layer plays a role in mapping various logical channels to various transport channels. And, the MAC layer also plays a role as logical channel multiplexing in mapping several logical channels to one transport channel. A set of logical channel types is defined for different data transfer services offered by MAC. Each logical channel type is defined according to the type of information transferred.

The RLC layer of the second layer supports reliable data transmission. The RLC layer performs segmentation and concatenation on data received from an upper layer to play a role in adjusting a size of the data to be suitable for a lower layer to transfer the data to a radio section. And, the RLC layer provides three kinds of RLC modes including a transparent mode (TM), an unacknowledged mode (UM) and an acknowledged mode (AM) to secure various kinds of QoS demanded by each radio bearer (RB). In particular, the AM RLC performs a retransmission function through automatic repeat and request (ARQ) for the reliable data transfer. The functions of the RLC layer may also be implemented through internal functional blocks of the MAC layer. In this case, the RLC layer need not be present.

A packet data convergence protocol (PDCP) layer of the second layer performs a header compression function for reducing a size of an IP packet header containing relatively large and unnecessary control information to efficiently transmit such an IP packet as IPv4 and IPv6 in a radio section having a small bandwidth. This enables a header part of data to carry mandatory information only to play a role in increasing transmission efficiency of the radio section. Moreover, in the LTE/LTE-A system, the PDCP layer performs a security function as well. This consists of ciphering for preventing data interception conducted by a third party and integrity protection for preventing data manipulation conducted by a third party.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a logical path that the second layer provides for data communication between the UE and the E-UTRAN. To accomplish this, the RRC layer of the UE and the RRC layer of the network exchange RRC messages. To Configure of Radio Bearers means that the radio protocol layer and the characteristic of channels are defined for certain service and that each of specific parameters and operating method are configured for certain service. The radio bearer can be divided signaling radio bearer (SRB) and data radio bearer (DRB). The SRB is used as a path for transmission RRC messages in the control plane, and the DRB is used as a path for transmission user data in the user plane.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (DL-SCH) for transmission of user traffic or control messages. User traffic or control messages of a downlink multicast or broadcast service may be transmitted through DL-SCH and may also be transmitted through a downlink multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channels for transmission of data from the UE to the network include a Random Access Channel (RACH) for transmission of initial control messages and an uplink SCH (UL-SCH) for transmission of user traffic or control messages. The UL-SCH supports HARQ and dynamic link adaptation by varying the transmit power and potentially modulation and coding. The UL-SCH also may enable the use of beamforming. The RACH is normally used for initial access to a cell.

Logical channels, which are located above the transport channels and are mapped to the transport channels. Logical channels are generally classified into two groups. The two groups are control channels for the transfer of control plane information and traffic channels for the transfer of user plane information.

Control channels are used for transfer of control plane information only. The control channels provided by MAC include a Broadcast Control Channel (BCCH), a Paging Control Channel (PCCH), a Common Control Channel (CCCH), a dedicated control channel (DCCH), a Multicast Control Channel (MCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bidirectional channel used by UEs having an RRC connection that transmits dedicated control information between a UE and the network.

Traffic channels are used for the transfer of user plane information only. The traffic channels provided by MAC include a dedicated traffic channel (DTCH), and a Multicast Traffic Channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

As an downlink physical channel for transmitting information forwarded on an downlink transport channel to a radio section between a network and a user equipment, there is a physical downlink shared channel (PDSCH) for transmitting information of DL-SCH, a physical multicast channel (PMCH) for transmitting information of MCH, a physical control format indicator channel (PDFICH) for indicating the number of OFDM symbols used for transmitting a physical downlink control channel (PDCCH), a physical HARQ (hybrid automatic repeat request) indicator channel (PHICH) for transmitting HARQ ACK (Acknowledge)/NACK (Non-acknowledge) as response to UL transmission or a PDCCH for transmitting such control information, as DL grant indicating resource allocation for transmitting a Paging Channel (PCH) and DL-SCH, information related to HARQ, UL grant indicating resource allocation for transmitting a UL-SCH and like that. As an uplink physical channel for transmitting information forwarded on an uplink transport channel to a radio section between a network and a user equipment, there is a physical uplink shared channel (PUCCH) for transmitting information of UL-SCH, a physical random access channel (PRACH) for transmitting RACH information or a physical uplink control channel (PUCCH) for transmitting such control information, which is provided by first and second layers, as HARQ ACK/NACK (Non-acknowledge), scheduling request (SR), channel quality indicator (CQI) report and the like.

NAS Protocol States (EMM & ECM)

The NAS state model is based on a two-dimensional model which consists of EPS Mobility Management (EMM) states and of EPS Connection Management (ECM) states. The EMM states describe the mobility management states that result from the mobility management procedures e.g., Attach and Tracking Area Update procedures. The ECM states describe the signaling connectivity between the UE and the EPC.

In detail, in order to manage mobility of a UE in NAS layers positioned in control planes of the UE and an MME, an EPS mobility management REGISTERED (EMM-REGISTERED) state and an EMM-DEREGISTERED state may be defined. The EMM-REGISTERED state and the EMM-DEREGISTERED state may be applied to the UE and the MME.

The UE is in the EMM deregistered state, like a state in which power of the UE is first turned on, and in order for the UE to access a network, a process of registering in the corresponding network is performed through an initial access procedure. When the access procedure is successfully performed, the UE and the MME transition to an EMM-REGISTERED state.

Also, in order to manage signaling connection between the UE and the network, an EPS connection management CONNECTED (ECM-CONNECTED) state and an ECM-IDLE state may be defined. The ECM-CONNECTED state and the ECM-IDLE state may also be applied to the UE and the MME. The ECM connection may include an RRC connection established between the UE and a BS and an S1 signaling connection established between the BS and the MME. The RRC state indicates whether an RRC layer of the UE and an RRC layer of the BS are logically connected.

That is, when the RRC layer of the UE and the RRC layer of the BS are connected, the UE may be in an RRC_CONNECTED state. When the RRC layer of the UE and the RRC layer of the BS are not connected, the UE in an RRC_IDLE state.

Here, the ECM and EMM states are independent of each other and when the UE is in EMM-REGISTERED state this does not imply that the user plane (radio and S1 bearers) is established In E-UTRAN RRC_CONNECTED state, network-controlled UE-assisted handovers are performed and various DRX cycles are supported. In E-UTRAN RRC_IDLE state, cell reselections are performed and DRX is supported.

The network may recognize the presence of the UE in the ECM-CONNECTED state by the cell and effectively control the UE. That is, when the UE is in the ECM-CONNECTED state, mobility of the UE is managed by a command from the network. In the ECM-CONNECTED state, the network knows about a cell to which the UE belongs. Thus, the network may transmit and/or receive data to or from the UE, control mobility such as handover of the UE, and perform cell measurement on a neighbor cell.

Meanwhile, the network cannot recognize the presence of the UE in the ECM-idle state and a core network (CN) manages the UE by the tracking area, a unit greater than cell. When the UE is in the ECM-idle state, the UE performs discontinuous reception (DRX) set by the NAS using an ID uniquely assigned in a tracking region. That is, the UE may monitor a paging signal at a particular paging opportunity in every UE-specific paging DRX cycle to receive broadcast of system information and paging information. Also, when the UE is in the ECM-idle state, the network does not have context information of the UE.

Thus, the UE in the ECM-idle state may perform a UE-based mobility-related procedure such as cell selection or cell reselection without having to receive a command from the network. When a location of the UE in the ECM-idle state is changed from that known by the network, the UE may inform the network about a location thereof through a tracking area update (TAU) procedure.

As described above, in order for the UE to receive a general mobile communication service such as voice or data, the UE needs to transition to an ECM-CONNECTED state. The UE is in the ECM-IDLE state like the case in which power of the UE is first turned on. When the UE is successfully registered in the corresponding network through an initial attach procedure, the UE and the MME transition to an ECM-CONNECTED state. Also, in a case in which the UE is registered in the network but traffic is deactivated so radio resource is not allocated, the UE is in an ECM-IDLE state, and when uplink or downlink new traffic is generated in the corresponding UE, the UE and the MME transition to an ECM-CONNECTED state through a service request procedure.

FIG. 5 illustrates a downlink subframe and physical channels in the wireless communication system to which the present invention can be applied.

Referring to FIG. 5, the downlink subframe includes a plurality of slots (e.g., two). The number of OFDM symbols included in one slot may be changed according to the length of a Cyclic Prefix (CP). For example, in case of a normal CP, the slot may include seven OFDM symbols. The downlink subframe is divided into a data region and a control region in a time domain. A maximum of three (or four) OFDM symbols located in the front part of a first slot of the subframe may correspond to a control region to which a control channel is allocated. The remaining OFDM symbols correspond to a data region to which a Physical Downlink Shared Channel (PDSCH) is allocated.

A variety of downlink control channels may be used in LTE/LTE-A, for example, a Physical Control Format Indicator Channel (PCFICH), a Physical Downlink Control Channel (PDCCH), a Physical hybrid ARQ indicator Channel (PHICH), etc. The PCFICH is transmitted on the first OFDM symbol of the subframe, and carries information about the number of OFDM symbols used for transmitting control channels within the subframe. The PHICH carries a Hybrid Automatic Repeat reQuest Acknowledgment/Negative-Acknowledgment (HARQ ACK/NACK) signal as a response to an uplink transmission signal.

Control information transmitted over a PDCCH is referred to as Downlink Control Information (DCI). DCI includes resource allocation information for either a UE or a UE group and other control information. For example, DCI includes UL/DL scheduling information, an UL transmission (Tx) power control command, etc.

The PDCCH carries a variety of information, for example, transmission format and resource allocation information of a DownLink Shared Channel (DL-SCH), transmission format and resource allocation information of an UpLink Shared Channel (UL-SCH), paging information transmitted over a Paging Channel (PCH), system information transmitted over the DL-SCH, resource allocation information of an upper-layer control message such as a random access response transmitted over PDSCH, a set of Tx power control commands of each UE contained in a UE group, a Tx power control command, activation indication information of Voice over IP (VoIP), and the like. A plurality of PDCCHs may be transmitted within a control region. A UE can monitor a plurality of PDCCHs. A PDCCH is transmitted as an aggregate of one or more contiguous Control Channel Elements (CCEs). The CCE is a logical allocation unit that is used to provide a coding rate based on a radio channel state to a PDCCH. The CCE may correspond to a plurality of Resource Element Groups (REGs). The format of PDCCH and the number of PDCCH bits may be determined according to the number of CCEs.

A eNB decides a PDCCH format according to DO to be sent to the UE, and adds a Cyclic Redundancy Check (CRC) to control information. The CRC is masked with an identifier (e.g., Radio Network Temporary Identifier (RNTI)) according to a PDCCH owner or a purpose of the PDCCH. For example, provided that the PDCCH is provided for a specific UE, a CRC may be masked with an identifier of the corresponding U E (e.g., cell-RNTI (C-RNTI)). If PDCCH is provided for a paging message, a CRC may be masked with a paging identifier (e.g., Paging-RNTI (P-RNTI)). If a PDCCH is provided for system information (e.g., System Information Block (SIB)), a CRC may be masked with system information RNTI (SI-RNTI). If PDCCH is provided for a random access response, a CRC may be masked with Random Access-RNTI (RA-RNTI), For example, CRC masking (or scrambling) may be performed using an exclusive OR (XOR) operation between CRC and RNTI at a bit level.

MBMS (Multimedia Broadcast/Multicast Service)

For MBMS, the following definitions may be introduced.

Multicast broadcast single frequency network (MBSFN) synchronization area: an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas MBSFN transmission or a transmission in MBSFN mode: a simulcast transmission technique realized by transmission of identical waveforms at the same time from multiple cells. An MBSFN transmission from multiple cells within the MBSFN area is seen as a single transmission by a UE.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e. when it knows which MBSFN area applies for the service(s) it is interested to receive.

MBSFN area reserved cell: A cell within a MBSFN area which does not contribute to the MBSFN transmission. The cell may be allowed to transmit for other services but at restricted power on the resource allocated for the MBSFN transmission.

Synchronization sequence: Each synchronization protocol data unit (SYNC PDU) contains a time stamp which indicates the start time of the synchronization sequence. For an MBMS service, each synchronization sequence has the same duration which is configured in the broadcast/multicast service center (BM-SC) and the MBMS coordination entity (MCE).

Synchronization Period: The synchronization period provides the time reference for the indication of the start time of each synchronization sequence. The time stamp which is provided in each SYNC PDU is a relative value which refers to the start time of the synchronization period. The duration of the synchronization period is configurable.

FIG. 6 illustrates definitions of MBMS in the wireless communication system to which the present invention can be applied.

Referring to FIG. 6, an MBMS service area may consists of one or more MBSFN area. The MBMS Service Area (MBMS SA) comprises of one or more MBMS Service Area Identities (MBMS SAIs), in any case each MBMS SA shall not include more than 256 MBMS SAIs. An MBMS SAI shall identify a group of cells within a PLMN, that is independent of the associated Location/Routing/Service Area and the physical location of the cell(s). A cell shall be able to belong to one or more MBMS SAs, and therefore is addressable by one or more MBMS SAIs.

In each MBSFN area, a plurality of cells, including a plurality of MBSFN area reserved cells, may exist.

Architecture of MBMS

In E-UTRAN, MBMS is only supported in a carrier shared with unicast traffic. Cells performing MBMS transmissions are referred to as MBMS/Unicast-mixed cells.

For the MBMS/Unicast mixed cells, MTCH and MCCH are mapped on MCH for point-to-multipoint transmission, and transmission of both unicast and MBMS in the cell is done in a co-ordinated manner.

MBMS reception is possible for UEs in RRC_CONNECTED or RRC_IDLE states. Whenever receiving MBMS services, a user shall be notified of an incoming call, and originating calls shall be possible. ROHC is not supported for MBMS.

FIG. 7 illustrates logical architecture of MBMS in the wireless communication system to which the present invention can be applied.

Multi-cell/multicast Coordinating Entity (MCE) is a logical entity—this does not preclude the possibility that it may be part of another network element—whose functions are:

the admission control and the allocation of the radio resources used by all eNBs in the MBSFN area for multi-cell MBMS transmissions using MBSFN operation. The MCE decides not to establish the radio bearer(s) of the new MBMS service(s) if the radio resources are not sufficient for the corresponding MBMS service(s) or may pre-empt radio resources from other radio bearer(s) of ongoing MBMS service(s) according to Allocation and Retention Priority (ARP). Besides allocation of the time/frequency radio resources this also includes deciding the further details of the radio configuration e.g. the modulation and coding scheme.

counting and acquisition of counting results for MBMS service(s).

resumption of MBMS session(s) within MBSFN area(s) based on e.g. the ARP and/or the counting results for the corresponding MBMS service(s).

suspension of MBMS session(s) within MBSFN area(s) based e.g. the ARP and/or on the counting results for the corresponding MBMS service(s).

In case of distributed MCE architecture, the MCE manages the above functions for a single eNB of a MBSFN. The coordination of the functions between MCEs is provided by OAM, if needed.

The MCE is involved in MBMS Session Control Signalling. The MCE does not perform signaling between UE and MCE.

Multimedia Broadcast Multicast Services Gateway (MBMS GW) is a logical entity—this does not preclude the possibility that it may be part of another network element—that is present between the Broadcast/Multicast Service Center (BMSC) and eNBs whose principal functions is the sending/broadcasting of MBMS packets to each eNB transmitting the service. The MBMS GW uses IP Multicast as the means of forwarding MBMS user data to the eNB. The MBMS GW performs MBMS Session Control Signalling (Session start/update/stop) towards the E-UTRAN via MME.

A Broadcast/Multicast Service Center (BM-SC) schedules the MBMS service, reports the MBMS service to the UE, and allocates bearer service identification. Further, the BM-SC starts or terminates an MBMS bearer resource (i.e., MBMS session). A BM-SC entity may function as an interface point for contents provider. The BM-SC may function as a termination point of an SYNC protocol through M1 interface.

The SYNC protocol is defined as a protocol to carry additional information that enable eNBs to identify the timing for radio frame transmission and detect packet loss. Every E-MBMS service uses its own SYNC entity. The SYNC protocol is applicable to DL and is terminated in the BM-SC.

The eNB, for supporting eMBMS, supports SYNC protocol with the BM-SC. The eNB joins IP multicast group for the user plane data delivery, and terminates the MCCH and indicates MBMS session start and stop to UE.

The MME provides the signaling path between the BM-SC and eNBs. That is, The BM-SC signals to the eNB through MME.

An Application Part is defined for M3 interface between MME and MCE. This application part allows for MBMS Session Control Signalling on E-RAB level (i.e. does not convey radio configuration data). The procedures comprise e.g. MBMS Session Start and Stop. SCTP is used as signalling transport i.e. Point-to-Point signalling is applied.

An Application Part is defined for M2 interface between the MCE and the eNB, which conveys at least radio configuration data for the multi-cell transmission mode eNBs and Session Control Signalling. SCTP is used as signalling transport i.e. Point-to-Point signalling is applied.

The M1 interface is a pure user plane interface between the MBMS GW and the eNB. Consequently no Control Plane Application Part is defined for this interface. IP Multicast is used for point-to-multipoint delivery of user packets.

The Sm is the control plane interface between MME and MBMS GW.

The SGmb/SGimb is the control plane/user plane interfaces between BMSC and MBMS GW.

Radio Channels for MBSFN

In general the control rmation relevant only for UEs supporting MBMS is separated as much as possible from unicast control rmation. Most of the MBMS control rmation is provided on a logical channel specific for MBMS common control rmation: the MCCH.

E-UTRA employs one MCCH logical channel per MBSFN area. In case the network configures multiple MBSFN areas, the UE acquires the MBMS control rmation from the MCCHs that are configured to identify if services it is interested to receive are ongoing.

The MCCH carries the MBSFNAreaConfiguration message, which indicates the MBMS sessions that are ongoing as well as the (corresponding) radio resource configuration. The MCCH may also carry the MBMSCountingRequest message, when E-UTRAN wishes to count the number of UEs in RRC_CONNECTED that are receiving or interested to receive one or more specific MBMS services.

A limited amount of MBMS control rmation is provided on the BCCH. This primarily concerns the rmation needed to acquire the MCCH(s). This rmation is carried by means of a single MBMS specific SystemInformationBlock: SystemInformationBlockType13. An MBSFN area is identified solely by the mbsfn-AreaId in SystemInformationBlockType13. At mobility, the UE considers that the MBSFN area is continuous when the source cell and the target cell broadcast the same value in the mbsfn-AreaId.

The MCCH rmation is transmitted periodically, using a configurable repetition period. Scheduling rmation is not provided for MCCH i.e. both the time domain scheduling as well as the lower layer configuration are semi-statically configured, as defined within SystemInformationBlockType13.

For MBMS user data, which is carried by the MTCH logical channel, E-UTRAN periodically provides MCH scheduling rmation (MSI) at lower layers (MAC). This MCH rmation only concerns the time domain scheduling i.e. the frequency domain scheduling and the lower layer configuration are semi-statically configured. The periodicity of the MSI is configurable and defined by the MCH scheduling period.

FIG. 8 illustrates Change of MCCH Information in the wireless communication system to which the present invention can be applied.

Referring to the FIG. 8, change of MCCH information (other than for Earthquake and Tsunami Warning System (ETWS), Commercial Mobile Alert System (CMAS) and Extended Access Barring (EAB) parameters) only occurs at specific radio frames, i.e. the concept of a modification period is used. Within a modification period, the same MCCH rmation may be transmitted a number of times, as defined by its scheduling (which is based on a repetition period). The modification period boundaries are defined by subframe number (SFN) values for which SFN mod m=0, where m is the number of radio frames comprising the modification period. The modification period is configured by means of SystemInformationBlockType13.

When the network changes (some of) the MCCH rmation, it notifies the UEs about the change during a first modification period. In the next modification period, the network transmits the updated MCCH rmation.

Different hatching of boxes in FIG. 8 indicates different MCCH information. Upon receiving a change notification, a UE interested to receive MBMS services acquires the new MCCH rmation immediately from the start of the next modification period. The UE applies the previously acquired MCCH rmation until the UE acquires the new MCCH rmation.

Indication of an MBMS specific RNTI, the M-RNTI, on PDCCH is used to rm UEs in RRC_IDLE and UEs in RRC_CONNECTED about an MCCH rmation change. When receiving an MCCH rmation change notification, the UE knows that the MCCH rmation will change at the next modification period boundary. The notification on PDCCH indicates which of the MCCHs will change, which is done by means of an 8-bit bitmap. Within this bitmap, the bit at the position indicated by the field notificationIndicator is used to indicate changes for that MBSFN area: if the bit is set to "1", the corresponding MCCH will change. No further details are provided e.g. regarding which MCCH rmation will change. The MCCH rmation change notification is used to rm the UE about a change of MCCH rmation upon session start or about the start of MBMS counting.

The MCCH rmation change notifications on PDCCH are transmitted periodically and are carried on MBSFN subframes only. These MCCH rmation change notification occasions are common for all MCCHs that are configured, and configurable by parameters included in SystemInformationBlockType13: a repetition coefficient, a radio frame offset and a subframe index. These common notification occasions are based on the MCCH with the shortest modification period.

E-UTRAN may modify the MBMS configuration rmation provided on MCCH at the same time as updating the MBMS configuration rmation carried on BCCH i.e. at a coinciding BCCH and MCCH modification period. Upon detecting that a new MCCH is configured on BCCH, a UE interested to receive one or more MBMS services should acquire the MCCH, unless it knows that the services it is interested in are not provided by the corresponding MBSFN area.

A UE that is receiving an MBMS service shall acquire the MCCH information from the start of each modification period. A UE that is not receiving an MBMS service, as well as UEs that are receiving an MBMS service but potentially interested to receive other services not started yet in another MBSFN area, shall verify that the stored MCCH rmation remains valid by attempting to find the MCCH rmation change notification at least notificationRepetitionCoeff times during the modification period of the applicable MCCH(s), if no MCCH rmation change notification is received.

In case the UE is aware which MCCH(s) E-UTRAN uses for the service(s) it is interested to receive, the UE may only need to monitor change notifications for a subset of the MCCHs that are configured, referred to as the 'applicable MCCH(s)' in the above.

Further, the Paging message may be used to rm UEs in RRC_IDLE and UEs in RRC_CONNECTED about a system rmation change. If the UE receives a Paging message including the systemInfoModification, it knows that the system rmation will change at the next modification period boundary. Although the UE may be rmed about changes in system rmation, no further details are provided e.g. regarding which system rmation will change.

In this case, SystemInformationBlockType1 includes a value tag, systemInfoValueTag, that indicates if a change has occurred in the system information (SI) messages. UEs may use systemInfoValueTag, e.g. upon return from out of coverage, to verify if the previously stored SI messages are still valid. Additionally, the UE considers stored system rmation to be invalid after 3 hours from the moment it was successfully confirmed as valid, unless specified otherwise.

E-UTRAN may not update systemInfoValueTag upon change of some system rmation e.g. ETWS rmation, CMAS rmation, regularly changing parameters like time information (SystemInformationBlockType8, SystemInformationBlockType16), EAB parameters. Similarly, E-UTRAN may not include the systemInfoModification within the Paging message upon change of some system rmation.

The UE verifies that stored system rmation remains valid by either checking systemInfoValueTag in SystemInformationBlockType1 after the modification period boundary, or attempting to find the systemInfoModification indication at least modificationPeriodCoeff times during the modification period in case no paging is received, in every modification period. If no paging message is received by the UE during a modification period, the UE may assume that no change of system rmation will occur at the next modification period boundary. If UE in RRC_CONNECTED, during a modification period, receives one paging message, it may deduce from the presence/absence of systemInfoModification whether a change of system rmation other than ETWS information, CMAS rmation and EAB parameters will occur in the next modification period or not.

ETWS and/or CMAS capable UEs in RRC_CONNECTED shall attempt to read paging at least once every defaultPagingCycle to check whether ETWS and/or CMAS notification is present or not.

MBMS Session Start/Stop Procedures

In general, network provides an MBMS service to one or more UEs in accordance with the following sequence:

When a session of the MBMS service starts, the eNB joins the MBMS service and then transmits MBMS data to one or more UEs.

When the session starts, the UE receives MCCH information related to the MBMS service and then establishes a radio bearer related to the MBMS service called an MBMS Point-to-Multipoint Radio Bearer (MRB).

While the eNB is transmitting the session to one or more UEs, the session may be updated, for example, with an update of the service area.

When the session of the MBMS service stops, the eNB leaves the MBMS service and stops transmitting MBMS data to one or more UEs.

When the session of the MBMS service stops, the UE receives updated MCCH information and then releases the MRB related to the MBMS service.

1) MBMS Session Start Procedure

The purpose of the MBMS Session Start procedure is to request the E-UTRAN to notify UEs about an upcoming MBMS Session of a given MBMS Bearer Service and to establish an MBMS E-RAB for this MBMS Session. The MBMS Session Start procedure is triggered by the EPC.

FIG. 9 illustrates MBMS session start procedure in the wireless communication system to which the present invention can be applied.

Step 1) The MME sends MBMS session start request message to the MCE(s) controlling eNBs in the targeted MBMS service area. The message includes the IP multicast address, session attributes and the minimum time to wait before the first data delivery.

Step 2) MCE checks whether the radio resources are sufficient for the establishment of new MBMS service(s) in the area it controls. If not, MCE decides not to establish the radio bearers of the MBMS service(s) and does not forward the MBMS session start request message to the involved eNBs, or may pre-empt radio resources from other radio bearer(s) of ongoing MBMS service(s) according to ARP. The MCE confirms the reception of the MBMS Session Start request to the MME. This message can be transmitted before the step 4. Only in case of distributed MCE architecture radio resource setup is scheduled according to the parameter "time of MBMS data transfer" which indicates an absolute start time of data delivery, otherwise according to the "minimum time to MBMS data transfer" parameter.

Step 3) MCE sends the MBMS Session Start message to the eNBs in the targeted MBMS service area. If the MBMS Session Start message includes the MBMS Service Area Identity with value 0, the MCE shall consider that all the eNBs are involved. The MCE then determines in which MBSFN area(s) the service should be delivered.

When to send the MBMS Session Start message from MCE to eNB according to the minimum time to wait indication is an MCE implementation issue.

Step 4) eNB confirms the reception of the MBMS Session Start message.

Step 5) MCE sends the MBMS Scheduling Information message to the eNB including the updated MCCH information which carries the MBMS service's configuration information. The MBMS service's configuration information may includes configuration of an MRB corresponding to the session and the MCCH update time indicating when the eNB should apply the updated MCCH information. This message can be transmitted before the step 3.

Step 6) eNB confirms the reception of the MBMS Scheduling Information message.

Step 7) eNB indicates MBMS session start to UEs by MCCH change notification and updated MCCH information which carries the MBMS service's configuration information. Indication of an MBMS specific RNTI, the M-RNTI, on PDCCH is used to norify UEs in RRC_IDLE and UEs in RRC_CONNECTED about an MCCH information change.

In detail, when the MBMS Scheduling Information message is received for the session start, the eNBs indicated the M-RNTI on the PDCCH in order to pass information to UEs in an MCCH modification period. Then, the eNBs update the MCCH information broadcast on the MCCH in the next MCCH modification period, according to the MCCH update time indicated by the MCE.

Step 8) eNB joins the IP multicast group to receive the MBMS User Plane data.

Step 9) eNB sends the MBMS data to radio interface at the determined time.

In detail, if a UE supporting the MBMS is interested in the MBMS service, it keeps monitoring the PDCCH using the configuration contained in SIB 13. When the PDCCH indicates a change in MCCH information in the MBSFN area concerning the MBMS service, the UE receives the MCCH to acquire the updated MCCH information for the MBSFN area.

Then, the UE establishes an MRB corresponding to the session with the updated MCCH information. When the MRB is established, the MTCH and the Physical Multicast Channel (PMCH) corresponding to the MRB are also configured.

After MRB establishment, the UE may receive MBMS user data from the MTCH. While the UE is moving across cells within the MBSFN area, the UE can continue to receive MBMS user data via the established MRB.

2) MBMS Session Stop Procedure

The MBMS Session Stop procedure is to request the E-UTRAN to notify UEs about the end of a given MBMS Session and to release the corresponding MBMS E-RAB this MBMS Session. The MBMS Session Stop procedure is triggered by the EPC.

FIG. 10 illustrates MBMS session stop procedure in the wireless communication system to which the present invention can be applied.

Step 1) The MME sends MBMS session stop request message to the MCE(s) controlling eNBs in the targeted MBMS service area.

Step 2) MCE confirms the reception of the MBMS Session stop request to the MME.

Step 3) MCE forwards the MBMS Session stop message to the eNBs in the targeted MBMS service area.

Step 4) eNB confirms the reception of the MBMS Session stop message.

Step 5) MCE sends the MBMS Scheduling Information message to the eNB including the updated MCCH information which carries the MBMS service's configuration information. This message can be transmitted before the step 3.

Step 6) eNB confirms the reception of the MBMS Scheduling Information message.

Step 7) eNB indicates MBMS session stop to UEs by removing any service configuration associated with the stopped session from the updated MCCH message.

In detail, when the MBMS Scheduling Information message is received, the eNB updates the MCCH information for the concerned MBSFN area and stops MBSFN transmission for the MRB corresponding to the session.

Step 8) The corresponding E-RAB (i.e., MRB) is released, and eNB leaves the IP multicast group.

While a session of the MBMS service is ongoing, the interested UE periodically receives the MCCH information from the MBSFN area concerning the MBMS service. The UE can recognize the Session Stop from the updated MCCH information.

MCCH Information Acquisition

The UE applies the MCCH information acquisition procedure to acquire the MBMS control information that is broadcasted by the E-UTRAN. The procedure applies to MBMS capable UEs that are in RRC_IDLE or in RRC_CONNECTED.

A UE interested to receive MBMS services shall apply the MCCH rmation acquisition procedure upon entering the corresponding MBSFN area (e.g. upon power on, following UE mobility) and upon receiving a notification that the MCCH rmation has changed. A UE that is receiving an MBMS service shall apply the MCCH rmation acquisition procedure to acquire the MCCH, that corresponds with the service that is being received, at the start of each modification period.

FIG. 11 illustrates an MCCH information acquisition procedure in the wireless communication system to which the present invention can be applied.

Referring to the FIG. 11, an MBMS capable UE shall:

1> if the procedure is triggered by an MCCH rmation change notification:

2> start acquiring the MBSFNAreaConfiguration message and the MBMSCountingRequest message if present, from the beginning of the modification period following the one in which the change notification was received;

The UE continues using the previously received MCCH rmation until the new MCCH rmation has been acquired.

1> if the UE enters an MBSFN area:

2> acquire the MBSFNAreaConfiguration message and the MBMSCountingRequest message if present, at the next repetition period;

1> if the UE is receiving an MBMS service:

2> start acquiring the MBSFNAreaConfiguration message and the MBMSCountingRequest message if present, that both concern the MBSFN area of the service that is being received, from the beginning of each modification period;

MBMS Interest Indication Procedure

In MBSFN area, a specific eNB may use multiple frequencies at the same time. For using radio resources efficiently, the network may provide the MBMS on only one frequency among the multiple frequencies, and may provide dedicated bearers to each UE on all multiple frequencies. In this case, if the UE, which receives a service using the dedicated bearer in a frequency not providing the MBMS, wants to receive the MBMS, the UE may have to be handed over to a frequency providing the MBMS.

For this, a network control option may be adopted as a basic architecture for handling the MBMS. The network may be informed about UE's interest in the MBMS by the UE, and then the network tries to ensure that the UE is able to receive the MBMS.

FIG. 12 illustrates an MBMS interest indication procedure in the wireless communication system to which the present invention can be applied.

The purpose of this procedure is to inform the E-UTRAN that the UE is receiving or is interested to receive MBMS via an MBMS Point to Multipoint Radio Bearer (MRB), and if so, to inform the E-UTRAN about the priority of MBMS versus unicast reception.

Referring to FIG. 12, at step S1201, the UE acquires a system information block 15 (SIB 15) from the E-UTRAN.

The UE may obtain the information on the frequency providing the MBMS that the UE wants to receive, by receiving a system information block (SIB)-15 from a serving cell.

If the UE would like to receive the MBMS, at step S1203, the UE transmits an MBMS interest indication (MBMSInterestIndication) to the eNB.

The MBMS interest indication may indicate that the UE wants to receive the MBMS. The MBMS interest indication may include information on the frequency which provides the MBMS that the UE wants to receive. That is, the MBMS interest indication provides MBMS interest information at the level of a frequency rather than of an individual service, and indicates UE's interest in MBMS frequency reception.

The UE may transmit the MBMS interest indication whenever the UE's interest changes.

Upon receiving the MBMS interest indication from the UE, the eNB acknowledges that the UE wants to receive the MBMS, and makes the UE move to a frequency providing the MBMS.

MBMS continuity is described. The UE who wants to receive a specific MBMS acknowledges information on frequency and time on which the specific MBMS is provided. When the MBMS is on air or is going to be broadcast soon, the UE sets a priority of a frequency providing the MBMS to the highest priority. The UE in the RRC_IDLE can move to a cell providing the MBMS and receive the MBMS by performing a cell reselection procedure using the frequency priority information which is set.

The MBMS interest indication procedure will be described in more detail hereinafter.

An MBMS capable UE in RRC_CONNECTED may initiate the procedure in several cases including 1) upon successful connection establishment, 2) upon entering or leaving the service area, 3) upon session start or stop, upon change of interest, 4) upon change of priority between MBMS reception and unicast reception or 5) upon change to a PCell broadcasting SystemInformationBlockType15, etc.

Upon initiating the procedure, the UE shall:

if SystemInformationBlockType15 is broadcast by the PCell:

1> ensure having a valid version of SystemInformationBlockType15 for the PCell;

2> if the UE did not transmit an MBMSInterestIndication message since last entering RRC_CONNECTED state; or 2> if since the last time the UE transmitted an MBMSInterestIndication message, the UE connected to a PCell not broadcasting SystemInformationBlockType15:

3> if the set of MBMS frequencies of interest is not empty:

4> initiate transmission of the MBMSInterestIndication message;

2> else:

3> if the set of MBMS frequencies of interest has changed since the last transmission of the MBMSInterestIndication message; or 3> if the prioritisation of reception of all indicated MBMS frequencies compared to reception of any of the established unicast bearers has changed since the last transmission of the MBMSInterestIndication message:

4> initiate transmission of the MBMSInterestIndication message;

The UE may send an MBMSInterestIndication even when it is able to receive the MBMS services it is interested in i.e. to avoid that the network allocates a configuration inhibiting MBMS reception.

The procedure for determination of MBMS frequencies of interest will be described in more detail hereinafter.

The UE shall:

1> consider a frequency to be part of the MBMS frequencies of interest if the following conditions are met:

2> at least one MBMS session the UE is receiving or interested to receive via an MRB is ongoing or about to start; and The UE may determine whether the session is ongoing from the start and stop time indicated in the USD.

2> for at least one of these MBMS sessions SystemInformationBlockType15 acquired from the PCell includes for the concerned frequency one or more MBMS SAIs as indicated in the USD for this session; and The UE considers a frequency to be part of the MBMS frequencies of interest even though E-UTRAN may (temporarily) not employ an MRB for the concerned session. That is, the UE does not verify if the session is indicated on MCCH.

2> the UE is capable of simultaneously receiving the set of MBMS frequencies of interest, regardless of whether a serving cell is configured on each of these frequencies or not; and 2> the supportedBandCombination the UE included in UE-EUTRA-Capability contains at least one band combination including the set of MBMS frequencies of interest;

Indicating a frequency implies that the UE supports SystemInformationBlockType13 acquisition for the concerned frequency. That is, the indication should be independent of whether a serving cell is configured on that frequency.

When evaluating which frequencies it can receive simultaneously, the UE does not take into account the serving frequencies that are currently configured. That is, it only considers MBMS frequencies it is interested to receive.

The above stated the term 'frequency' does not indicate a physical frequency but covers the associated band(s), noting that additional bands may be indicated in SystemInformationBlockType1 (serving frequency) or SystemInformationBlockType15 (neighbouring frequencies).

The procedure for setting the contents of the MBMSInterestIndication message will be described in more detail hereinafter.

The UE shall set the contents of the MBMSInterestIndication message as follows:

1> if the set of MBMS frequencies of interest is not empty:

2> include mbms-FreqList and set it to include the MBMS frequencies of interest, using the E-UTRA Absolute Radio Frequency Channel Number (EARFCN) corresponding with freqBandIndicator included in SystemInformationBlockType1, if applicable, and the EARFCN(s) as included in SystemInformationBlockType15;

The mbms-FreqList merely indicates the physical frequencies the UE is interested to receive and does not imply the UE supports the associated band.

2> include mbms-Priority if the UE prioritises reception of all indicated MBMS frequencies above reception of any of the unicast bearers;

If the UE prioritises MBMS reception and unicast data cannot be supported because of congestion on the MBMS carrier(s), E-UTRAN may initiate release of unicast bearers. It is up to E-UTRAN implementation whether all bearers or only Guaranteed Bit Rate (GBR) bearers are released. E-UTRAN does not initiate re-establishment of the released unicast bearers upon alleviation of the congestion.

The UE shall submit the MBMSInterestIndication message to lower layers for transmission.

MBMS Counting Procedure

The MBMS Counting procedure is used by the E-UTRAN to count the number of RRC_CONNECTED mode UEs which are receiving via an MRB or interested to receive via an MRB the specified MBMS services.

The UE determines interest in an MBMS service that is identified by the TMGI, by interaction with upper layers.

FIG. 13 illustrates an MBMS Counting procedure in the wireless communication system to which the present invention can be applied.

Referring to FIG. 13, at step S1301, E-UTRAN initiates the procedure by sending an MBMSCountingRequest message.

Upon receiving the MBMSCountingRequest message, at step S1303, the UE in RRC_CONNECTED mode shall:

1> if the SystemInformationBlockType1, that provided the scheduling information for the systemInformationBlockType13 that included the configuration of the MCCH via which the MBMSCountingRequest message was received, contained the identity of the Registered PLMN; and 1> if the UE is receiving via an MRB or interested to receive via an MRB at least one of the services in the received countingRequestList:

2> if more than one entry is included in the mbsfn-AreaInfoList received in the SystemInformationBlockType13 that included the configuration of the MCCH via which the MBMSCountingRequest message was received:

3> include the mbsfn-AreaIndex in the MBMSCountingResponse message and set it to the index of the entry in the mbsfn-AreaInfoList within the received SystemInformationBlockType13 that corresponds with the MBSFN area used to transfer the received MBMSCountingRequest message;

2> for each MBMS service included in the received countingRequestList:

3> if the UE is receiving via an MRB or interested to receive via an MRB this MBMS service:

4> include an entry in the countingResponseList within the MBMSCountingResponse message with countingResponseService set it to the index of the entry in the countingRequestList within the received MBMSCountingRequest that corresponds with the MBMS service the UE is receiving or interested to receive;

2> submit the MBMSCountingResponse message to lower layers for transmission upon which the procedure ends;

UEs that are receiving an MBMS User Service by means of a Unicast Bearer Service (i.e. via a DRB), but are interested to receive the concerned MBMS User Service via an MBMS Bearer Service (i.e. via an MRB), respond to the counting request.

If ciphering is used at upper layers, the UE does not respond to the counting request if it cannot decipher the MBMS service for which counting is performed.

The UE treats the MBMSCountingRequest messages received in each modification period independently. In the unlikely case E-UTRAN would repeat an MBMSCountingRequest (i.e. including the same services) in a subsequent modification period, the UE responds again.

Service Continuity

Service continuity procedures (or Mobility procedures) for MBMS reception allow the UE to start or continue receiving MBMS service(s) via MBSFN when changing cell(s). E-UTRAN procedures provide support for service continuity with respect to mobility within the same MBSFN area. Within the same geographic area, MBMS services can be provided on more than one frequency and the frequencies used to provide MBMS services may change from one geographic area to another within a PLMN.

UEs that are receiving MBMS service(s) in RRC_IDLE state performing cell reselection or are in RRC_CONNECTED state obtain target cell MTCH information from the target cell MCCH. Mechanisms to deliver MCCH to UE via handover command are not supported.

To avoid the need to read MBMS related system information and potentially MCCH on neighbour frequencies, the UE is made aware of which frequency is providing which MBMS services via MBSFN through the combination of the following MBMS assistance information:

user service description (USD): in the USD, the application/service layer provides for each service the Temporary Mobile Group Identity (TMGI), the session start and end time, the MBMS frequencies and the MBMS service area identities (e.g., MBMS SAIs) belonging to the MBMS service area;

system information: MBMS and non-MBMS cells indicate in SystemInformationBlockType15 the MBMS SAIs of the current frequency and of each neighbour frequency.

The MBMS SAIs of the neighbouring cell may be provided by X2 signaling (i.e. X2 Setup and eNB Configuration Update procedures) or/and OAM.

When applying the procedures described below for UEs in RRC_IDLE and RRC_CONNECTED state:

the UE does not need to verify that a frequency is providing a MBMS service by acquiring MCCH and may apply these procedures even though a MBMS service is not provided via MBSFN;

the UE may consider that a service is provided if a session of this service is ongoing as derived from the session start and end times indicated for this service in the USD and if a frequency provides this service;

the UE determines the frequency on which a service is provided according to the following:

if the serving cell provides SystemInformationBlockType15, the UE considers that a frequency is providing the MBMS service via MBSFN if and only if one of the MBMS SAI(s) of this frequency as indicated in SystemInformationBlockType15 of the serving cell is indicated for this MBMS service in the USD;

if the serving cell does not provide SystemInformationBlockType15, the UE in RRC_IDLE state may consider that a frequency included in the USD for the MBMS service is providing this MBMS service as long as the UE reselects cells where SystemInformationBlockType13 is provided.

1) In RRC_IDLE, the UE applies the normal cell reselection rules with the following modifications:

the UE which is receiving MBMS service(s) via MBSFN and can only receive these MBMS service(s) via MBSFN while camping on the frequency providing these MBMS service(s) is allowed to make this frequency highest priority;

the UE which is interested in receiving MBMS service(s) via MBSFN and can only receive these MBMS service(s) via MBSFN while camping on the frequency providing these MBMS service(s) is allowed to make this frequency highest priority when it intends to receive these MBMS service(s) and a session is already available or about to start via MBSFN;

when the MBMS service(s) which the UE is interested in are no longer available (after the end of the session) or the UE is no longer interested in receiving the service(s), the UE no longer prioritises the frequency providing these MBMS service(s);

2) In RRC_CONNECTED, the UE that is receiving or interested to receive MBMS via MBSFN informs the network about its MBMS interest via a RRC message and the network does its best to ensure that the UE is able to receive MBMS and unicast services subject to the UE's capabilities:

the UE indicates the frequencies which provide the service(s) that the UE is receiving or is interested to receive simultaneously, and which can be received simultaneously in accordance with the UE capabilities.

the UE indicates its MBMS interest at RRC connection establishment (the UE does not need to wait until AS security is activated), and whenever the set of frequencies on which the UE is interested in receiving MBMS services has changed compared with the last indication sent to the network (e.g. due to a change of user interest or of service availability).

- the UE may only indicate its interest when the PCell provides SystemInformationBlockType15 and after having acquired SystemInformationBlockType15 of the current PCell.
- the UE may indicate its MBMS interest even if the current configured serving cell(s) do not prevent it from receiving the MBMS services it is interested in.
- the UE indicates with a single bit whether it prioritises MBMS reception over unicast. This priority indication applies to all unicast bearers and all MBMS frequencies. It is sent whether the MBMS frequencies are congested or not.
- the E-UTRAN reuses the SupportedBandCombination IE to derive the UEs MBMS related reception capabilities, i.e. the E-UTRAN tries to ensure that the UE is able to receive MBMS and unicast bearers by providing them on the frequencies indicated in SupportedBandCombination IE signalled by the UE. The UE shall support MBMS reception on any serving cell and on any cell that may be additionally configured as serving cell according to the UE capabilities for unicast reception.
- for handover preparation, the source eNB transfers the MBMS interest of the UE, if available, to the target eNB. After handover, the UE reads SystemInformationBlockType15 before updating its MBMS interest. If SystemInformationBlockType15 is provided on the target cell but not on the source cell, the UE indicates its MBMS interest after handover.

If MBMS is prioritised and the unicast connection cannot be maintained because of congestion on the MBMS carrier then the E-UTRAN releases unicast bearers. The E-UTRAN does not trigger re-establishment of the released unicast bearers. For congestion control, the E-UTRAN can rely on existing access control mechanisms.

The E-UTRAN may take into account the UE priority for MBMS or unicast reception when receiving an indication of proximity to a CSG cell from a UE which also indicated interest in MBMS reception (or vice-versa).

Cell Selecting Procedure

A basic purpose of selecting a cell is to receive a service from a eNB. For example, if signal strength or quality between a UE and a eNB is lowered due to movement of the UE, the UE reselects another cell in order to maintain data transmission quality. Hereinafter, physical signal characteristics related to the strength of a signal or the ratio of noise/interference of a signal will be referred to as signal characteristics.

A cell reselection method may be divided according to a radio access technology (RAT) of a cell participating in reselecting a cell and to a frequency characteristic as follows:

- intra-frequency cell reselection in which a UE reselects a cell which uses the same RAT and the same center frequency as a serving cell;
- inter-frequency cell reselection in which a UE reselects a cell which uses the same RAT as a serving cell and a different center frequency from the serving cell; and
- inter-RAT cell reselection in which a UE reselects a cell which uses a different RAT from a serving cell.

FIG. 14 illustrates a procedure for selecting a cell by a UE in idle mode in the wireless communication system to which the present invention can be applied.

Referring to the FIG. 14, if a UE is powered on, the UE starts operation in an idle mode. The UE automatically or manually selects a public land mobile network (PLMN) which is to be served and a RAT for communication (S1401). Information about the PLMN and RAT may be selected by the user of the UE or may be stored in a universal subscriber identity module (USIM).

The UE performs an initial cell selection process for selecting a cell having the greatest signal strength or quality value among cells having signal strength or quality values greater than a reference value (S1403). The reference value refers to a value defined in a system in order to guarantee quality of a physical signal during data transmission and reception. Accordingly, the reference value may vary with an applied RAT. The UE receives system information (SI) which is periodically transmitted by the eNB. The system information includes basic and indispensable information necessary when the UE accesses a network. The system information may include a neighbor cell list (NCL) related to cells adjacent to a serving cell. Therefore, the UE should receive all the system information before accessing the eNB and always have the latest system information. If power is on, the UE selects a cell in order to receive the system information in an idle mode.

The UE registers information (e.g., international mobile station identifier (IMSI)) thereof in a network to receive a service (e.g., paging) from the network (S1407). The UE does not always register the information thereof in the network whenever selecting a cell and registers the information when network information (e.g., tracking area identity (TAI)) received from the system information is different from network information known thereto (S1405).

If a signal strength or quality value measured from the eNB of the serving cell is lower than a value measured from a eNB of a neighbor cell, the UE selects another cell providing better signal characteristics than the cell of the eNB. If a priority is defined between frequencies or RATS, the UE selects a cell in consideration of the priority (S1409). This process is called a cell reselection process to discriminate from the initial cell selection of S1403. Reference symbol received power (RSRP), reference symbol received quality (RSRQ), and received signal strength indicator (RSSI) may be used as a signal measurement value.

An operation and state performed when the UE in idle mode reselects a cell in S1409 will now be described in detail.

Basically, the UE can receive a normal service in a suitable cell. When the UE has not selected a suitable cell, the UE can receive only a limited service such as an emergency call from an acceptable cell. A description of the terms is as follows.

A. Acceptable Cell not barred: whether a cell is acceptable or not is indicated as one bit through system information.

when an acceptable state is designated, the acceptable cell satisfies a minimum signal characteristic value for selecting a cell (i.e., satisfies a minimum cell reselection criterion).

B. Suitable Cell satisfies a condition of an acceptable cell.

PLMN registered by a UE or PLMN to which a serving cell belongs.

To perform an operation for selecting the acceptable cell or suitable cell, a state of a UE may be defined. The state and operation of the UE are as follows.

A. 'Any Cell Selection' state: a state for attempting to camp on an acceptable cell.

B. 'Camped-on Any Cell' state: a state camped on an acceptable cell and a state for periodically attempting cell reselection for camping on a suitable cell. A limited service such as an emergency call can be received. When camped on a suitable cell, the 'Camped-on Any Cell' state transitions to 'Camped normally' state.

The following operation in 'Camped-on Any Cell' state is performed:
- receipt of a paging message
- receipt of system information
- measurement for cell reselection
- cell reselection
- periodic search of a suitable cell C. 'Camped normally' state: a state camped on a suitable cell. If a better suitable cell than a serving cell is found, cell reselection is performed. If another suitable cell is not found even though the serving cell does not satisfy a condition of a suitable cell (e.g., a signal characteristic value of the serving cell is lower than a threshold value), the 'Camped normally' state transitions to 'Any Cell Selection' state to search an acceptable cell.

The following services in 'Camped normally' state can be performed:
- receipt of a paging message
- receipt of system information
- measurement for cell reselection
- cell reselection 'Being camped on a cell' refers that a UE tunes a central frequency of the cell and use a control channel. Therefore, the UE can receive control information such as a paging message and system information from a camped-on cell. The UE can also perform a random access process or can request the eNB of a radio resource control (RRC) connection.

A basic operation in FIG. 14 for the UE to reselect a cell according to signal characteristics has been described. The following is considered as a case requiring cell selection:
- UE capability
- subscriber information
- camp load balancing
- traffic load balancing UE capability refers to select a cell according to a frequency band which can be selected by a UE because the UE may have a limited available frequency band. The UE may be set to select or not to select a specific cell according to subscriber information or operator policy. Camp load balancing refers to select a cell which is being used by a small number of UEs in order to reduce data load generated when UEs in idle-mode are activated in a single cell. Similarly, traffic load balancing serves to change a cell in order to reduce data load generated by activated UEs.

In order to effectively achieve the above cell selection process, a priority may be defined with respect to frequencies or RATs so that a UE can select a specific frequency or RAT having the priority during cell selection or cell reselection. When a plurality of frequencies/RATs is present, the frequencies/RATs may have different priorities or the same priority. Alternatively, some of the frequencies/RATs may have the same priority. Only a frequency or RAT having a priority may be selected during cell reselection.

Cell Reselection Priority

Absolute priorities of different E-UTRAN frequencies or inter-RAT frequencies may be provided to the UE in the system information, in the RRCConnectionRelease message, or by inheriting from another RAT at inter-RAT cell (re)selection. In the case of system information, an E-UTRAN frequency or inter-RAT frequency may be listed without providing a priority (i.e. the field cellReselectionPriority is absent for that frequency). If priorities are provided in dedicated signalling, the UE shall ignore all the priorities provided in system information. If UE is in 'Camped-on Any Cell' state, UE shall only apply the priorities provided by system information from current cell, and the UE preserves priorities provided by dedicated signalling unless specified otherwise. When the UE in 'Camped Normally' state, has only dedicated priorities other than for the current frequency, the UE shall consider the current frequency to be the lowest priority frequency (i.e. lower than the eight network configured values). While the UE is camped on a suitable CSG cell, the UE shall always consider the current frequency to be the highest priority frequency (i.e. higher than the eight network configured values), irrespective of any other priority value allocated to this frequency. The UE shall delete priorities provided by dedicated signalling when:
- the UE enters RRC_CONNECTED state; or
- the optional validity time of dedicated priorities (T320) expires; or
- a PLMN selection is performed on request by NAS The UE shall only perform cell reselection evaluation for E-UTRAN frequencies and inter-RAT frequencies that are given in system information and for which the UE has a priority provided.

The UE shall not consider any black listed cells as candidate for cell reselection.

The UE shall inherit the priorities provided by dedicated signalling and the remaining validity time (i.e., T320 in E-UTRA, T322 in UTRA and T3230 in GERAN), if configured, at inter-RAT cell (re)selection.

The network may assign dedicated cell reselection priorities for frequencies not configured by system information.

Group Communication Service

For Group communication service, the following definitions may be introduced.
- Group Member: A user assigned to a Group Communication System Enabler (GCSE) Group.
- GCSE Group: A set of Group Members.
- Receiver Group Member: A Group Member of a GCSE Group that has interest expressed in receiving ongoing or future Group Communications of that GCSE Group.
- Transmitter Group Member: A Group Member of a GCSE Group that is authorized to transmit an ongoing or future Group Communications for that GCSE Group.
- Group Communication: Communication from Transmitter Group Members to Receiver Group Members.
- Group Communication System Enabler (GCSE): A 3GPP feature enabling an application layer functionality to provide Group Communication over E-UTRAN.
- Multipoint Service: A service used to distribute the same content to many UEs in a resource efficient way.

A Group Communication Service is intended to provide a fast and efficient mechanism to distribute the same content to multiple users in a controlled manner. As an example, the concept of group communications is used extensively in the operation of classical Land Mobile Radio (LMR) systems used for, but not limited to, Public Safety organizations. At the moment, the primary use of a Group Communication Service in LMR is to provide "Push to Talk" (PTT) functionality, so a Group Communication Service based on 3GPP architecture, using LTE radio technology, should enable PTT voice communications with comparable performance.

The service should allow flexible modes of operation as the users and the environment they are operating in evolves. For example, the capabilities of LTE allow for broadband communication, so Group Communication Service is expected to support, voice, video or, more general, data communication. Also LTE can allow users to communicate to several groups at the same time in parallel e.g. voice to one group, different streams of video or data to several other groups.

The users of Group Communication Service are organised into groups; a user can be member of more than one group.

Functional Requirements

High level requirements

The ability to make use of the Group Communication System Enabler provided by the 3GPP system shall be enabled on a Group Member basis.

The system shall provide a mechanism to indicate network support of Group Communication System Enabler to the UE.

The UE shall have the ability to indicate the network support of Group Communication System Enabler to the user.

Group Communication System Enabler shall support various media such as conversational type communication (e.g. voice, video) or streaming (e.g. video) or data (e.g. messaging) or a combination of them.

The system shall be able to uniquely identify a GCSE group. The system shall be able to uniquely identify a Group Member within a GCSE group The system shall provide a mechanism to send a Group Communication to all Receiver Group Members.

Only Receiver Group Members of the GCSE Group shall be able to receive from that GCSE Group via Group Communication.

The system shall be able to authorise a Group Member to become a Transmitter Group Member.

A Transmitter Group Member shall be able to transmit to a GCSE Group that it is a member of, with or without being a Receiver Group Member of that GCSE Group.

The interface between the GCSE client on the UE and the network shall be an open interface.

The network shall provide a third party interface for Group Communication. This implies that the interface supports e.g. charging and authentication/authorisation.

The system shall provide a mechanism for a Group Member that is not connected via a 3GPP network, to communicate in a Group Communication for a GCSE Group that it is a member of.

Performance) The system shall be optimized to minimize the time intervals related to the use of Group Communication.

The recommended time intervals specified below are for consideration in the development of detailed RAN/CN requirements, and the evaluation of architecture solutions.

The system should provide a mechanism to support a Group Communication end-to-end setup time less than or equal to 300 ms. It is assumed that this value is for an uncontended network, where there is no presence checking and no acknowledgements requested from Receiver Group Member(s). The end-to-end setup time is defined as the time between when a Group Member initiates a Group Communication request on a UE and the point when this Group Member can start sending start sending a voice or data communication.

The time from when a UE requests to join an ongoing Group Communication to the time that it receives the Group Communication should be less than or equal to 300 ms.

The end to end delay for media transport for Group Communications should be less than or equal to 150 ms.

Service Continuity

When UEs are moving among cells during Group Communication, service continuity shall be supported.

Resource Efficiency

The system shall provide a mechanism to efficiently distribute data for Group Communication.

Scalability

The number of Receiver Group Members in any area may be unlimited.

The system shall support multiple distinct Group Communications in parallel to any one UE that is capable of supporting that number of distinct Group Communications in parallel. The mechanisms defined shall allow future extension of the number of distinct Group Communications supported in parallel.

This includes both multiple Group Communications within the same GCSE Group, and multiple Group Communications associated with multiple GCSE Groups. The actual number of such Group Communications achievable and desirable will depend on the type of media.

Security Requirements for Group Communication

The system shall support at least the same security level for Group Communication (e.g. for Authentication, Integrity, Confidentiality and Privacy) as a 3GPP LTE packet data bearer.

Charging Requirements for Group Communication

The system shall support the collection of resource and service usage rmation for Group Communication.

Roaming and Network Interworking Requirements

The system shall support the transmitting and/or receiving of Group Communication by Group Members that are roaming.

Subject to operator agreement, the system shall be able to support Group Communications where Group Members are attached to different PLMNs.

An interface shall be provided to enable Group Communication interworking between a network offering GCSE-based Group Communication Services with either or both of:

another 3GPP network offering GCSE-based Group Communication Services, a non-3GPP network offering group communication services.

High availability of Group Communication) The system shall be capable of achieving high levels of availability for Group Communications utilising GCSE_LTE, e.g. by seeking to avoid single points of failure in the GCSE_LTE architecture and/or by including recovery procedures from network failures.

Group Handling

Creation, Modification, and Deletion of GCSE Groups

The system shall provide a mechanism for the dynamic creation, modification, and deletion of GCSE Groups.

Information additional to the set of Group Members shall be associated with a GCSE Group, to be used by the system to identify the GCSE Group and to specify attributes that determine how it is changed and used. This may be used to, e.g. define which Group Members are authorized for administrative functions, and whether the GCSE Group can be relayed via ProSe.

The system shall provide notification of the creation or deletion of a GCSE Group to its Group Members.

If authorised, a user shall be able to request and receive a list of all the GCSE Groups for which it is a Group Member.

A mechanism shall be provided such that, if authorized, a user may modify rmation associated with a GCSE Group, add or remove Group Members of a GCSE Group, or create/delete a GCSE Group.

If authorized, a user shall be able to request and receive a list of Group Members of a particular GCSE Group.

If authorized, a user shall be able to request a notification for when specific or any Group Member(s) is added to or removed from a particular GCSE Group.

The system shall provide a mechanism to remotely configure a UE with any GCSE related rmation.

Geographical Scope of GCSE Groups

GCSE Groups shall by definition be of system wide scope. Optionally, GCSE Groups may be geographically restricted.

The system shall provide a mechanism to restrict all Group Communications for a given GCSE Group to a defined geographic area. In this case Group Members shall be able to receive and/or transmit only within this geographic area.

The system shall provide a mechanism to redefine the geographic area for a GCSE Group that has a defined geographic area.

The system shall provide a mechanism to override geographic area restrictions for a GCSE Group for a particular Group Communication transmission.

The system shall provide a mechanism to restrict a particular Group Communication transmission to a defined geographic area within the geographical scope of that group. In this case only Receiver Group Members within the geographic area shall receive the Group Communication.

Group Communication

Group Communication Setup Requirements

A Transmitter Group Member shall be able to transmit a Group Communication for a GCSE Group without knowledge of the identities of other GCSE Group Members.

A Group Member shall be able to request to join or leave an established Group Communication.

The system shall provide a mechanism to setup, release, and modify a multipoint service with applicable parameters e.g. QoS, priority.

The system shall validate the parameters received in the request to setup or modify a Group Communication based on the policy specified by the group's subscription rmation, e.g. checks for QoS, priority.

The system shall provide the means to notify the requesting entity of any updates in the status of an on-going Group Communication.

The system shall provide notification to the requesting entity of the outcome of a request to setup, release, or modify a multipoint service.

Services to the Group Member

The system shall provide a mechanism to permit a Group Member to request notification when a Group Communication is initiated using that GCSE group.

The system shall provide notification of a Group Communication to Group Members that have requested notification for the GSCE Group.

Group Member Requests of the System

A Group Member shall be able to express interest to receive Group Communications when the GCSE Group is used for Group Communications.

The system shall provide a mechanism for a Receiver Group Member receiving a Group Communication to be able to accept, reject, or ignore the Group Communication.

The system shall provide a mechanism for a Receiver Group Member receiving a Group Communication to be required to accept the Group Communication.

Priority and Pre-Emption of GCSE Communication

The following requirements apply to the allocation and retention of system resources:

The system shall provide a mechanism to support at least n priority levels for Group Communication.

The system shall provide a mechanism to support reassignment of Group Communication priority level.

The network operator shall be able to configure each Group Communication priority level with the ability to pre-empt lower priority Group Communications and non-Group Communications traffic.

The system shall provide a mechanism to allow pre-emption of lower priority for Group Communications and non-Group Communications traffic.

Group Members within a GCSE Group shall be able to have different priorities from each other.

Services Provided During an On-Going Group Communication

For Group Communication services that require floor control (i.e. the ability to arbitrate who currently has the right to transmit)

The Group Member shall be able to request the floor;

The system shall be able to arbitrate floor requests and grant permissions to Group Members.

A Transmitter Group Member shall be uniquely identified to the Receiver Group Members.

An entity shall be able to request a notification when a specific Group Member ceases to be a Receiver Group Member.

A Receiver Group Member ceases to be a Receiver Group Member of a certain group by:

user decision third party decision after a service dependent amount of time after a system configurable amount of time of unavailability.

A notification shall be provided to the requesting entity when a specific Group Member ceases to be a Receiver Group Member.

During the lifetime of a Group Communication the Receiver Group Members of the Group Communication may change. In the case where there are no Receiver Group Members, Transmitter Group Members would need to know that there are no other Receiver Group Members, and when another Receiver Group Member returns to the Group Communication.

A Transmitter Group Member ceases to be a Transmitter Group Member of a certain group by:

user decision third party decision after a service dependent amount of time after a system configurable amount of time of unavailability.

User Perception of Group Communication

All Receiver Group Members in a given area shall receive the Group Communication at the same time according to user perception.

All changes to the GCSE Group (e.g., adding or removing group members) shall take effect as soon as possible.

All changes to the set of Receiver Group Members shall take effect in the Group Communication as soon as possible.

Interaction with Other Services and Functions

Emergency Calling

The ability for a UE to make an emergency call shall be unaffected by being in a Group Communication.

Interaction with Proximity-Based Services (ProSe)

If EPC and E-UTRAN support ProSe, the EPC and E-UTRAN shall be able to make use of ProSe Group Communication and the public safety ProSe UE-to-Network Relay for Group Communication, subject to operator policies and UE capabilities or settings.

A public safety ProSe-enabled UE not served by E-UTRAN shall be able to support Group Communication based on ProSe Communication paths. A public safety ProSe-enabled UE shall be able to dynamically express its interest in receiving, via a public safety ProSe UE-to-Network Relay, the Group Communications of one or more GCSE Groups for which it is authorized.

A public safety ProSe UE-to-Network Relay shall be able to relay Group Communication to/from ProSe Communication paths, if the following conditions apply:
  the GCSE Group is allowed to be relayed; and
  the public safety ProSe UE-to-Network Relay is allowed to relay Group Communication.

A public safety ProSe UE-to-Network Relay shall be able to restrict the relayed Group Communication on a per group basis.

The system shall support groups whose membership shall be the same irrespective of whether a Group Communication is made using ProSe Group Communication or GCSE Group Communication.

GCSE Group Members shall be able to access Group Communication services using ProSe Communication paths and/or by EPC Path.

Architecture of GCSE Service

FIG. 15 illustrates GCSE architecture in the wireless communication system to which the present invention can be applied.

This high-level architecture diagram consists of Application layer and 3GPP EPS layer. The Application layer consists of Group Communication Service Enabler Application Server (GCSE AS). The 3GPP EPS layer consists of a Multipoint Service (MuSe) function. The MuSe function interworks with the 3GPP EPS entities to provide the MuSe functionality. For example, MBMS GW and BM-SC (FIG. 7) may provide the MuSe function.

The reference points related to the application server (e.g., GCSE application server) will be described hereinafter.

GC1: It is the reference point between the GCSE application in the UE and in the application server. It is used to define application level signalling requirement to enable Multipoint functionality for GCSE_LTE, and possibly for session establishment and floor control usages, etc.

GC2: It is the reference point between the GCSE AS and the MuSe function. It is used to define the interaction between and MuSe functionality provided by the 3GPP EPS layer.

GC3: It is the reference point between the E-UTRAN and MuSe function. It is used to define the interaction between E-UTRAN and MuSe function in order to achieve Multipoint functionality provided by the 3GPP EPS layer.

GC4: It is the reference point between the MME and MuSe function It is used to define the interaction between MME and MuSe function in order to achieve Multipoint functionality provided by the 3GPP EPS layer.

GC5: It is the reference point between the P-GW and MuSe function. It is used to provide DL unicast service by MuSe.

Group Communication Over Pre-Configured eMBMS

FIGS. 16a and 16b illustrate Group Communication procedure over pre-configured eMBMS in the wireless communication system to which the present invention can be applied.

Step 1) Group is managed by GCSE AS. GCSE AS requests BM-SC to assign TMGI to the group.

Step 2) The eMBMS bearer corresponding to the TMGI is pre-established.

Step 3) UE downloads USD of the pre-configured eMBMS bearer in advance. The USD may be received from either eMBMS or unicast bearer.

Step 4) The UE establishes QoS Class Indicator (QCI)=5 EPS bearer for GCSE signaling and registers to the GCSE AS over the EPS bearer. When the UE registers with the GCSE server, the UE reports its capability and indicates if it is within MBMS coverage. UE may also register to BM-SC for security keys.

Step 5) The group call session is established in advance. This step is similar to the session establishment procedure of PoC (push to talk over cellular). The unicast EPS bearer is established for future sending and/or receiving (in case of eMBMS bearer is not available) of group communication. UE activities eMBMS receiving by reading SIB2, SIB13, SIB15 and MCCH.

Step 6) When a UE presses PTT button, the UE performs service request procedure to enter RRC_CONNECTED if the UE is in RRC_IDLE.

Step 7) The originating UE sends Floor Request to GCSE AS.

GCSE AS knows whether eMBMS is available from UEs' location and capability information from step 4. GCSE AS sends Talker Identity to UEs in the same bearer as media, i.e. pre-configured eMBMS bearer (if available) and/or unicast bearer (for UEs not in eMBMS coverage).

The UEs in eMBMS coverage monitor MSI (MBMS scheduling information) on MCH at the beginning of each MSP (MBMS scheduling period). The shortest MSP is 80 ms in current standard. So, the average user plane delay on eMBMS air interface can be as short as 40 ms.

When UE detects scheduling information for the MTCH of the group, UE tunes to the MTCH to receive the Talker Identity message and the following media.

Step 8) The GCSE AS sends Floor Grant to the originating UE. It is up to GCSE AS implementation on the timing of sending Floor Grant. Ideally, the Talker Identity message and the first media packet should be sent by eNB in the same MSP. Otherwise, after Talker Identity is delivered, one more MSP delay is needed for media transmission.

Step 9) UE sends media to GCSE AS. GCSE AS forwards the media to the eMBMS bearer and/or the unicast bearer(s).

Congestion Control for Preconfigured MRB

Preconfigured MBMS bearer is used for special purpose, e.g. Public Safety service and/or group communication service, to save the group call setup time. The preconfigured MBMS bearer is always ongoing. So if MBMS service UE interested in is transmitted via the preconfigured MRB, the UE is always on the corresponding frequency regardless of actual data transfer. So, many UEs gather on the MBMS frequency and this cause congestion.

That is, referring to FIG. 15, an MRB is preconfigured in a Step 2 but real data are transmitted in a Step 9 during a Group Communication procedure over pre-configured eMBMS bearer (hereinafter, 'MRB').

When an MBMS SERVICE start time point is previously determined, the UE may know an MBM start time point. Accordingly, when the MBMS start time point comes, the UE may perform cell reselection to a corresponding cell (i.e., cell providing MBMS through preconfigured MRB). However, for example, in a case of an MBMS service such as Public Safety service and/or group communication service where the MBMS service start time point is not previously determined, since the UE does not know when the MBMS service starts (that is, data transmission through preconfigured MRB), the UE monitors MBMS scheduling information (MSI) at a start time point of each MBMS scheduling period.

In this manner, since the MRB is previously established, paging is continuously transmitted. Further, when the UE transmits the paging to uplink, an uplink resource is insufficient. Thus, if the UE is changed to an RRC_CONNECTED mode, a dedicated resource is insufficient so that congestion occurs. Further, since the UE continuously monitors the preconfigured MRB, power consumption of the UE is increased, Accordingly, hereinafter, the present invention suggests a method of controlling congestion in the preconfigured MRB.

FIG. 17 is a diagram illustrating a preconfigured MRB control method according to an embodiment of the present invention.

Referring to FIG. 17, UE is informed of the state of interested MBMS service (e.g., public safety service and/or group communication service) provided by preconfigured MBMS bearer (MRB) from network (e.g., E-UTRAN) (S1701).

Desirably, the state of MBMS service is "activation" (ON) or "deactivation" (OFF). The "activation" is a state that there is actual data transfer or that is expected. The "deactivation" is a state that there is no actual data transfer or that is expected.

In this case, the preconfigured MBMS bearer is ongoing regardless of actual data transfer. That is, as illustrated in an example of FIG. 16, an MRB is previously set (Step 2). But, when a state of the MBMS service provided through a corresponding MRB is "activation" (ON) (for example, real group communication is performed), the MBMS data may be transmitted (Step 9).

In this case, state information on the MBMS provided through the preconfigured MRB may be transmitted from the preconfigured MRB or a radio bearer different from the preconfigured MRB. In addition, the state information may be transmitted from a frequency (or cell) of the MBMS service provided by the preconfigured MRB or from a frequency (or cell) of a service provided by a radio bearer different from the preconfigured MRB.

In detail, if the MBMS provided through the preconfigured MRB is activated so that data of the MBMS service is transmitted, the UE may receive state information on the MBMS service through a preconfigured MRB (or frequency (or cell) of the MBMS service provided by a preconfigured MRB). Conversely, if the MBMS provided through the preconfigured MRB is not activated so that data of the MBMS is not transmitted, the UE may receive state information on the MBMS service through a radio bearer different from the preconfigured MRB (or a frequency (or cell) of a service provided by another radio bearer different from the preconfigured MRB).

In this case, state information of the MBMS service may be transmitted to the UE through one of system information, a MAC control element (CE) or a paging message. A detailed description thereof will be given later.

The UE determines whether to make a cell reselection priority of an MBMS frequency providing the interested MBMS service to be a highest priority in accordance with an indicated state of an interested MBMS service (S1703).

In a case of UE in an RRC-IDLE state, UE determines whether to makes the cell reselection priority of MBMS frequency providing the interested MBMS service (e.g., group communication and/or public safety service) to be a highest priority in accordance with indicated state of interested MBMS service providing by preconfigured MRB.

For example, if system information (or MAC CE or paging message) indicates that the state of interested MBMS service is "activation", UE makes the MBMS frequency providing the interested MBMS service highest priority. Then, UE may perform cell reselection procedure the MBMS frequency providing the interested MBMS service and camp on the MBMS frequency providing the interested MBMS service.

In contrast, if system information (or MAC CE, paging message) indicates that the state of interested MBMS service is "deactivation", the UE may not change the cell reselection priority of the MBMS frequency providing an interested MBMS service, even though the UE is interested in the MBMS service. For example, in case of receiving the state information of "deactivation" through another frequency except for the MBMS frequency providing the interested MBMS service, the UE may not change the cell reselection priority of the MBMS frequency providing the interested MBMS service.

Further, if system information indicates that the state of interested MBMS service is "deactivation", UE may come back to the cell reselection priority setting that UE used before prioritizing the MBMS frequency providing the interest MBMS service. For example, in case of receiving the state information of "deactivation" through the MBMS frequency providing the interested MBMS service, the UE may make the frequency which the UE used before prioritizing the MBMS frequency providing the interest MBMS service to be highest priority.

Meanwhile, the UE in an RRC-CONNECTED state determines whether to transmit a MBMS interest indication message indicating the MBMS frequency providing the interested MBMS according to an indicated state of the interested MBMS provided through preconfigured.

For example, when the system information (or MAC CE or paging message) indicates that a state of the interested MBMS is "activation", the UE transmits MBMS frequency information (or MBMS service identifier information or preconfigured MRB identifier information) to the network through a MBMS interest indication message. Then, the UE may perform handover to an MBMS frequency providing the interested MBMS service.

In contrast, when the system information (or MAC CE or paging message) indicates that a state of the interested MBMS is "deactivation", the UE may not transmit the MBMS interest indication message indicating the frequency providing the interested MBMS service to the network. For example, the UE may transmit information of a frequency before handover to the MBMS frequency providing the interested MBMS service to the network through the MBMS interest indication message. Then, the UE may perform handover to a frequency different from the MBMS frequency providing the interested MBMS service.

As described above, the preconfigured MRB means an established state in the UE and the network. For example, in a case of an existing scheme, if an MRB is previously established in the UE, the UE continuously monitors the established MRB (i.e., preconfigured MRB). The UE monitors whether to transmit MBMS data through a corresponding preconfigured MRB by receiving MBMS scheduling information transmitted through a network at a predetermined time interval. Then, the UE receives MBMS data transmitted through the network through a corresponding preconfigured MRB from the network.

However, according to the present invention, even though the MRB is previously established in the UE, if MBMS service data are not actually transmitted through a corresponding MRB, the UE does not monitor a corresponding preconfigured MRB. That is, the UE sets a priority of a frequency of the MBMS provided by a preconfigured MRB to which MBMS service data are not actually transmitted lower than the highest priority. In addition, if state information of the MBMS provided by a corresponding preconfigured MRB in another radio bearer (for example, dedicated bearer) or another frequency (or cell) indicates activation, the UE performs cell reselection to a corresponding frequency by setting a priority of a frequency providing a corresponding MBMS as the highest priority to monitor a corresponding frequency.

In this case, an initial state of the preconfigured MRB is default and may be previously set as "deactivation". In this case, when the corresponding MRB is established, the UE performs only a MRB establishment procedure, and does not monitor a frequency (or cell) providing the MBMS through a corresponding preconfigured MRB. Although an establishment procedure of a corresponding MRB is terminated, the UE may monitor another frequency (or cell) using a cell reselection priority before establishing a corresponding preconfigured MRB.

In contrast, when a preconfigured MRB is established, state information (that is, initial state information of the preconfigured MRB) on the preconfigured MRB may be transmitted together from the network. In this case, the UE may determine whether to monitor a frequency providing the MBMS through a corresponding MRB according to initial state information on the preconfigured MRB received from the network.

Hereinafter, the following is a method of transmitting state information of the MBMS.

1) First, state information of the MBMS may be transmitted to the UE through system information or an MAC CE. When the UE is in a RRC-CONNECTED state, particularly, state information of the MBMS may be transmitted to the UE through an MAC CE.

In this case, new system information block (=SIB) or MAC CE can be defined to inform of the state of MBMS service providing by preconfigured MBMS bearer (MRB). A new system information block may be illustrated at SIB.x.

Further, the state of MBMS service providing by preconfigured MRB may be transmitted through a defined system information block or MAC CE according to the related art. For example, the state of group communication can be added in existing SIB15.

In this manner, when the state of MBMS service is transmitted through new system information (or SIB 15 when the state of group communication information is added in SIB 15), the SIB is independent from system information modification period. In this way, when the state of MBMS service is transmitted through new system information (or SIB 15 when the state of group communication information is added in SIB 15), the SIB is independent from system information modification period. It means that the SIB (or SIB 15 when the state of group communication information is added in SIB 15) can change anytime regardless of modification period. In other words, when the UE receives changed state information of an interested MBMS service through SIB.x (or SIB 15 when the state of group communication information is added in SIB 15), the UE may directly apply the changed state information of MBMS service.

In this manner, when the state information on the interested MBMS is transmitted to the UE through the SIB or the MAC CE, a corresponding SIB or MAC CE may include a change notification indicating that a MBMS service identity (for example, group communication identity) and the state information on the interested MBMS are changed.

2) In addition, information (i.e., change notification) indicating that the state information of the MBMS is changed may be reported to the UE through a paging message. That is, The new SIB (or SIB 15 when the state of group communication information is added in SIB 15) or MAC CE change notification can be added in paging message.

In this case, the method may further include receiving a change notification indicating that the state information of the MBMS provided through the preconfigured MRB by the UE before step S1701 of FIG. 7.

Then, at step S1703, state information of the MBMS may be transmitted to the UE through system information (i.e., SIB.x or SIB 15) or an MAC CE. When the UE is in a RRC-CONNECTED state, particularly, state information of the MBMS may be transmitted to the UE through an MAC CE.

In this case, if paging message notifies that the new SIB (or SIB 15) or MAC CE changed, UE immediately reads the new SIB (or SIB 15) or MAC CE.

In detail, when the UE confirms that state information of the interested MBMS provided through the preconfigured MRB through a paging message is changed while monitoring a current serving cell (that is, a cell which provides the interested MBMS or a cell which does not provide the interested MBMS), the UE receives the new SIB (or SIB 15) or MAC CE firstly transmitted after a reception time point of the paging message. For example, the new SIB (or SIB 15) or MAC CE may be transmitted in a next frame of a sub-frame to which the paging message is transmitted.

In this case, the paging message may include a MBMS service identity (for example, a group communication identity) and a change notification indicating that state information on the interested MBMS is changed.

This notification is independent from existing system information change notification. That is, if the UE receives a paging message indicating that the state information of the MBMS provided according to the preconfigured MRB is changed, the UE may receive changed state information of the MBMS through a next transmitted SIB.x or MAC CE, and may directly apply the changed state information of the MBMS.

3) Further, the state of MBMS service (e.g., group communication and/or public safety service) can be indicated in paging message. In this case, the paging message may include a MBMS service identity (for example, a group communication identity).

In this manner, by transmitting the state information of the MBMS service provided through the preconfigured MRB on a paging message, when the UE receives the paging message, although system information or a MAC CE is not received afterward, the UE may confirm the state of MBMS service.

In this case, only when a state of the MBMS service provided through the pre-configured MRB is changed, the paging message may be transmitted. For example, only when the state of MBMS service is changed from 'activation' to 'deactivation' or from 'deactivation' to 'activation', information amount included in the paging message may be substantially reduced by transmitting the paging message.

As described above, the state information of the MBMS service may be transmitted to the UE through system information or control element (MAC CE) or a paging message.

Simultaneously, the P-RNTI may be newly defined. In detail, new P-RNTI can be defined, and it is used for group call notification, and/or GCSE service state change notification, and/or preconfigured MBMS service state change notification. That is, the UE receives the paging message by checking the P-RNTI. In addition, as described above, the UE may confirm the state information of the MBMS service provided through the preconfigured MRB transmitted through the paging message. Alternatively, the UE may confirm state information of the MBMS service provided through the preconfigured MRB transmitted through a SIB or the MAC CE to be next transmitted.

In this case, new paging occasion and paging cycle can be defined, and it is used for group call notification, and/or GCSE service state change notification, and/or preconfigured MBMS service state change notification. That is, the UE may confirm state information of a group call, a GCSE, or preconfigured MBMS service by checking the P-RNTI in a paging occasion for every paging cycle. In this manner, information one newly defined paging occasion, paging cycle, and/or P-RNTI may be transmitted to the UE through system information. In this case, a paging occasion and paging cycle with reference to the paging message, and the P-RNTI for identifying the paging message may be dedicatedly defined in a specific MBMS service or a preconfigured MRB.

Further, notification with respect to the group call, the GCSE, or the preconfigured MBMS service may also indicate whether the service provided by MBMS bearer or by unicast.

FIG. 18 is a diagram illustrating a preconfigured MRB control method according to an embodiment of the present invention.

It is assumed that the UE is in a RRC_IDLE state, and the preconfigured MRB is established in FIG. 18. Further, it is assumed that the MBMS service provided by the preconfigured MRB is a group communication 1. In addition, it is assumed that the state information of the MBMS service provided by the preconfigured MRB through system information (i.e., SIB.x) is transmitted, and change notification of the state information of the MBMS service is transmitted through the paging message.

Referring to FIG. 18, UE camped on cell A (S1801). The downlink carrier frequency of cell A is frequency 1.

The UE becomes interested in group communication 1. The group communication 1 is provided by preconfigured MBMS bearer on frequency 2. The downlink carrier frequency of cell B is frequency 2.

The UE receives system information from the network (e.g., E-UTRAN)(S1803). That is, UE reads SIB.x to know whether the interested group communication provided by preconfigured MRB is activated or not. In a case of FIG. 18, the state of group communication 1 is deactivation, so the UE keeps staying on frequency 1 (i.e., cell A). That is, the UE does not change the cell reselection priority of the frequency 2 (i.e., cell B) providing an interested MBMS service, even though the UE is interested in the MBMS service. Thus, the UE does not monitor frequency 2.

The UE periodically receives paging message through cell A from network A by checking a P-RNTI in paging occasions every paging cycle (S1805).

In this case, the paging occasion, the paging cycle and the P-RNTI that UE may acquire via system information may be dedicated to the group communication or the preconfigured MBMS bearer. In a case of FIG. 18, the paging notifies that the SIB.x is changed.

Upon receiving the paging message, UE immediately receives system information from network (S1807). That is, UE immediately reads SIB.x to check the state of group communication 1.

That is, the UE confirms a SIB.x firstly transmitted after receiving the paging message. For example, the SIB.x to which the state information of the MBMS service may be transmitted in a sub-frame after the sub-frame to which the paging message is transmitted.

In a case of FIG. 18, the SIB.x indicates that the group communication 1 becomes activated.

UE makes cell reselection priority of frequency b (i.e., cell B) highest priority (S1809).

Then, UE performs cell reselection procedure and camped on cell B (S1811).

Then, UE receives the group communication 1 by MBSFN transmission on frequency b (i.e., cell B).

UE receives paging message through cell B from network (S1813).

That is, UE periodically receives paging message from cell B by checking a P-RNTI in paging occasions every paging cycle. In a case of FIG. 18, the paging notifies that the SIB.x changed.

Upon receiving paging message, UE immediately receives system information from network (S1815). That is, UE immediately reads SIB.x to check the state of group communication 1.

That is, the UE confirms the SIB.x firstly transmitted after receiving the paging message. For example, a SIB.x to which the state information of the MBMS service is transmitted may be transmitted in a sub-frame after the sub-frame to which the paging message is transmitted. In a case of FIG. 18, the SIB.x indicates that the group communication 1 is deactivated.

UE come back to the cell reselection priority setting that UE used before prioritizing the MBMS frequency (S1817). That is, the cell reselection priority of frequency b becomes low.

Then, UE performs cell reselection procedure and camped on cell A (S1819).

FIG. 19 is a diagram illustrating a preconfigured MRB control method according to an embodiment of the present invention.

It is assumed that the UE is in a RRC_CONNECTED and the preconfigured MRB is established. It is assumed that the MBMS service provided by the preconfigured MRB is a group communication 1. Moreover, it is assumed that the state information of the MBMS service provided by the preconfigured MRB through the system information (i.e., SIB.x) is transmitted, and change notification of the state information of the MBMS service is transmitted through the paging message.

Referring to FIG. 19, UE camped on cell A (S1901). The downlink carrier frequency of cell A is frequency 1.

The UE becomes interested in group communication 1. The group communication 1 is provided by preconfigured MBMS bearer on frequency 2. The downlink carrier frequency of cell B is frequency 2.

The UE receives system information from the network (e.g., E-UTRAN)(S1903). UE reads SIB.x to know whether the interested group communication provided by preconfigured MRB is activated or not. In a case of FIG. 19, the state of group communication 1 is deactivation, so the UE keeps staying on frequency 1 (i.e., cell A). That is, the UE does not monitor frequency 2.

UE periodically receives paging message through cell A from network by checking a P-RNTI in paging occasions every paging cycle (S1905).

In this case, the paging occasion, the paging cycle and the P-RNTI that UE may acquire via system information may be dedicated to the group communication or the preconfigured MBMS bearer. In a case of FIG. 19, the paging notifies that the SIB.x is changed.

Upon receiving the paging message, UE immediately receives system information from network (S1907). That is, UE immediately reads SIB.x to check the state of group communication 1.

That is, the UE confirms the SIB.x firstly transmitted after receiving the paging message. For example, the SIB.x to which the state information of the MBMS service may be transmitted in a sub-frame after the sub-frame to which the paging message is transmitted.

In a case of FIG. 19, the SIB.x indicates that the group communication 1 becomes activated.

UE sends a MBMS interest indication message indicating the frequency b (i.e., cell B), the group communication, and/or the preconfigured MBMS bearer to network (S1909).

In this case, in order to indicate the group communication, a MBMS service ID (e.g., temporary mobile group identity (TMGI)) and a session ID may be used. Furthermore, so as to indicate the preconfigured MBMS bearer, a bearer identity may be used.

The UE performs handover procedure to cell B (S1911).

Then, UE receives the group communication 1 by MBSFN transmission on frequency b (i.e., cell B).

UE receives paging message through cell B from network (S1913).

That is, UE periodically receives paging message from cell B by checking a P-RNTI in paging occasions every paging cycle. In case of FIG. 19, the paging notifies that the SIB.x changed.

Upon receiving paging message, UE immediately receives system information from network (S1915). That is, UE immediately reads SIB.x to check the state of group communication 1.

That is, the UE confirms a SIB.x firstly transmitted after receiving the paging message. For example, the SIB.x to which the state information of the MBMS service may be transmitted in a sub-frame after the sub-frame to which the paging message is transmitted.

In a case of FIG. 19, the SIB.x indicates that the group communication 1 is deactivated.

UE sends a MBMS interest indication message not indicating the frequency b, the group communication, and/or the preconfigured MBMS bearer to network (S1917).

For example, as illustrated in FIG. 19, the UE may transmits MBMS an interest indication message indicating a frequency a (i.e., cell A).

The UE performs handover procedure to cell A (S1919).

Apparatus for Implementing the Present Invention

FIG. 20 illustrates a block diagram of a wireless communication apparatus according to an embodiment of the present invention.

Referring to the UE includes a processor (or digital signal processor) 2010, RF module (RF unit) 2035, power management module 2005, antenna 2040, battery 2055, display 2015, keypad 2020, memory 2030, SIM card 2025 (which may be optional), speaker 2045 and microphone 2050. The UE may include a single antenna or multiple antennas.

The processor 2010 may be configured to implement the functions, procedures and/or methods proposed by the present invention as described in FIG. 1-19. Layers of a wireless interface protocol may be implemented by the processor 2010.

The memory 2030 is connected to the processor 2010 and stores information related to operations of the processor 2010. The memory 2030 may be located inside or outside the processor 2010 and may be connected to the processors 2010 through various well-known means.

A user enters instructional information, such as a telephone number, for example, by pushing the buttons of a keypad 2020 or by voice activation using the microphone 2050. The microprocessor 2010 receives and processes the instructional information to perform the appropriate function, such as to dial the telephone number. Operational data may be retrieved from the Subscriber Identity Module (SIM) card 2025 or the memory module 2030 to perform the function. Furthermore, the processor 2010 may display the instructional and operational information on the display 2015 for the user's reference and convenience.

The RF module 2035 is connected to the processor 2010, transmits and/or receives an RF signal. The processor 2010 issues instructional information to the RF module 2035, to initiate communication, for example, transmits radio signals comprising voice communication data. The RF module 2035 comprises a receiver and a transmitter to receive and transmit radio signals. An antenna 2040 facilitates the transmission and reception of radio signals. Upon receiving radio signals, the RF module 2035 may forward and convert the signals to baseband frequency for processing by the processor 2010. The processed signals would be transformed into audible or readable information outputted via the speaker 2045.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

Although the method of receiving an MBMS service in the wireless communication system was described while focusing on the 3GPP LTE/LTE-A according the present invention, various wireless communication systems are applicable except for the 3GPP LTE/LTE-A system.

The invention claimed is:

1. A method of receiving a Multimedia Broadcast/Multicast Service (MBMS) service in a wireless communication for supporting an MBMS, the method comprising:
receiving, by a User Equipment (UE), a change notification indicating that state information of an interested MBMS service provided by a preconfigured MBMS Point to Multipoint Radio Bearer (MRB) from a network is changed from the network;
receiving, by the UE, the state information of the interested MBMS service; and
determining, by the UE, whether to make a cell reselection priority of a MBMS frequency providing the interested MBMS service to be a highest priority according to the state information of the interested MBMS service,
wherein the change notification is transmitted through a paging message, and
wherein a paging occasion and a paging cycle with respect to the paging message and a Paging Radio Network Temporary Identifier (P-RNTI) for identifying the paging message are dedicatedly defined in the MBMS service.

2. The method of claim 1, wherein the state information of the MBMS service indicates an activation state to which data of the MBMS service are transmitted or indicates a deactivation state to which the data of the MBMS service are not transmitted.

3. The method of claim 2, wherein the UE makes the cell reselection priority of the MBMS frequency providing the interested MBMS service to be the highest priority when the state information of the MBMS service indicates the activation state.

4. The method of claim 2, wherein the UE does not change the cell reselection priority of the MBMS frequency providing the interested MBMS service when the state information of the MBMS service indicates the deactivation state.

5. The method of claim 1, further comprising performing, by the UE, a cell reselection procedure.

6. The method of claim 1, wherein the state information of the MBMS service is transmitted through one of system information, a Medium Access Control (MAC) Control Element (CE), or a paging message.

7. A User Equipment (UE) for receiving a Multimedia Broadcast/Multicast Service (MBMS) service in a wireless communication for supporting an MBMS, the UE comprising:
a Radio Frequency (RF) which transmits/receives a wireless signal; and
a processor,
wherein the processor:
receives a change notification indicating that state information of an interested MBMS service provided by a preconfigured MBMS Point to Multipoint Radio Bearer (MRB) from a network is changed from the network,
receives the state information of the interested MBMS; and
determines whether to make a cell reselection priority of a MBMS frequency providing the interested MBMS service to be a highest priority according to the state information of the interested MBMS service,
wherein the change notification is transmitted through a paging message, and
wherein a paging occasion and a paging cycle with respect to the paging message and a Paging Radio Network Temporary Identifier (P-RNTI) for identifying the paging message are dedicatedly defined in the MBMS service.

* * * * *